(12) United States Patent
Yang et al.

(10) Patent No.: US 11,924,126 B2
(45) Date of Patent: Mar. 5, 2024

(54) RANDOM ACCESS IN WIRELESS COMMUNICATION

(71) Applicant: ZTE Corporation, Guangdong (CN)

(72) Inventors: Ling Yang, Guangdong (CN); Yajun Zhao, Guangdong (CN); Kaiying Lv, Guangdong (CN)

(73) Assignee: ZTE Corporation, Guangdong (CN)

( * ) Notice: Subject to any disclaimer, the term of this patent is extended or adjusted under 35 U.S.C. 154(b) by 408 days.

(21) Appl. No.: 17/215,343

(22) Filed: Mar. 29, 2021

(65) Prior Publication Data

US 2021/0227577 A1 Jul. 22, 2021

Related U.S. Application Data

(63) Continuation of application No. PCT/CN2018/108466, filed on Sep. 28, 2018.

(51) Int. Cl.
H04L 1/00 (2006.01)
H04L 5/00 (2006.01)
H04L 27/26 (2006.01)
H04W 72/0446 (2023.01)
H04W 72/0453 (2023.01)
H04W 74/00 (2009.01)

(52) U.S. Cl.
CPC .......... *H04L 5/0048* (2013.01); *H04L 1/0071* (2013.01); *H04L 27/2602* (2013.01); *H04L 27/2607* (2013.01); *H04W 72/0446* (2013.01); *H04W 72/0453* (2013.01); *H04W 74/008* (2013.01); *H04W 74/0833* (2013.01)

(58) Field of Classification Search
CPC . H04L 1/0071; H04L 5/0048; H04L 27/2602; H04L 27/2607; H04W 72/0446; H04W 72/0453; H04W 74/008; H04W 74/0833
See application file for complete search history.

(56) References Cited

U.S. PATENT DOCUMENTS

| 2010/0278128 A1 | 11/2010 | Lee et al. |
| 2013/0029680 A1 | 1/2013 | Park et al. |
| 2016/0021681 A1 | 1/2016 | Nan et al. |

(Continued)

FOREIGN PATENT DOCUMENTS

| CN | 108282874 A | 7/2018 |
| WO | 2018/064367 | 4/2018 |
| WO | 2018/139575 A1 | 8/2018 |

OTHER PUBLICATIONS

Extended Search Report of co-pending European Patent Application No. 18930365.4, filed Sep. 28, 2018, dated Apr. 11, 2022, 10 pages.

(Continued)

*Primary Examiner* — Brian P Cox
(74) *Attorney, Agent, or Firm* — Perkins Coie LLP

(57) ABSTRACT

A wireless communication technique includes generating, by a wireless terminal, a transmission message that includes a preamble portion and a data portion. In this technique, transmission resources for the data portion are related to transmission resources for the preamble portion using a relationship rule. The wireless terminal transmits the transmission message to a network-side device during a random access procedure.

16 Claims, 25 Drawing Sheets

(56) References Cited

U.S. PATENT DOCUMENTS

2018/0124626 A1    5/2018  Tsai et al.
2019/0357268 A1   11/2019  Zhao et al.
2020/0136708 A1*   4/2020  Pan .................... H04B 7/0408
2021/0337597 A1   10/2021  Yoshimura et al.

OTHER PUBLICATIONS

InterDigital Communications, "2-step random access procedure" 3GPP TSG RAN WGI AH_NR Meeting Spokane, USA, Jan. 16-20, 2017, R1-1700703, 4 pages.

Office Action for co-pending Japanese Patent Application No. 2021-517675, dated Apr. 12, 2023, 4 pages with unofficial summary of office action.

Office Action for co-pending Chinese Patent Application No. 2018800998391, dated Aug. 17, 2022, 16 pages with unofficial translation.

International Search Report and Written Opinion in International Application No. PCT/CN2018/108466, dated May 29, 2019, 6 pages.

First Examination Report for co-pending Indian Patent Application No. 202147017138, dated Oct. 12, 2022, 6 pages.

Office Action for co-pending Japanese Patent Application No. 2021-517675, dated Sep. 30, 2022, 10 pages with unofficial summary of office action.

Sony, "Discussions on 2 Steps RACH Procedure" 3GPP TSG RAN WG1 adhoc_NR_AH_1701 R1-1700668, Jan. 9, 2017, 7 pages.

JPO, Decision to Grant for Japanese Application No. 2021-517675, dated Oct. 12, 2023, 5 pages with English translation.

\* cited by examiner

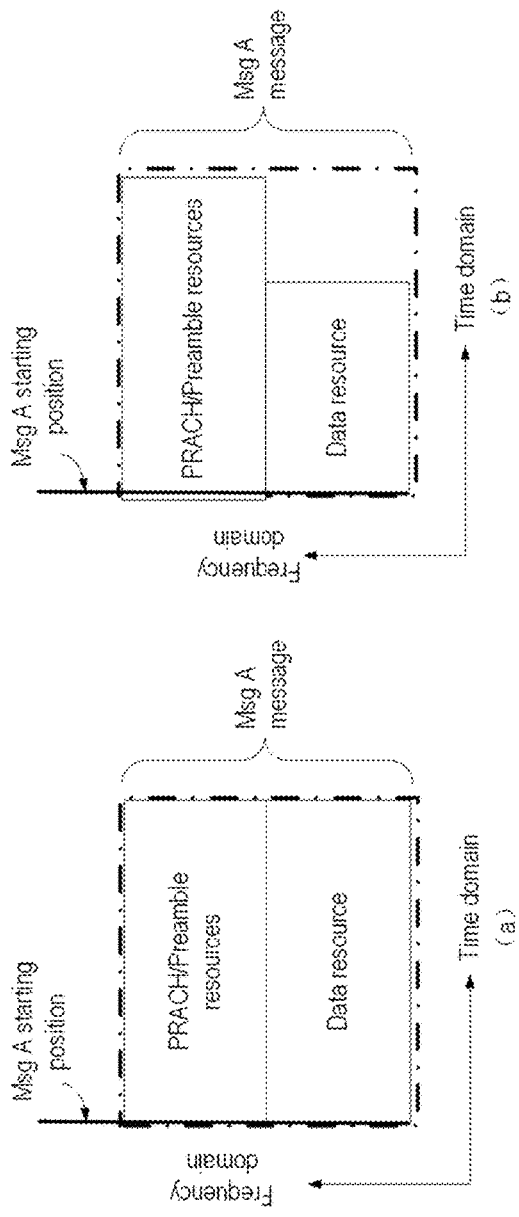
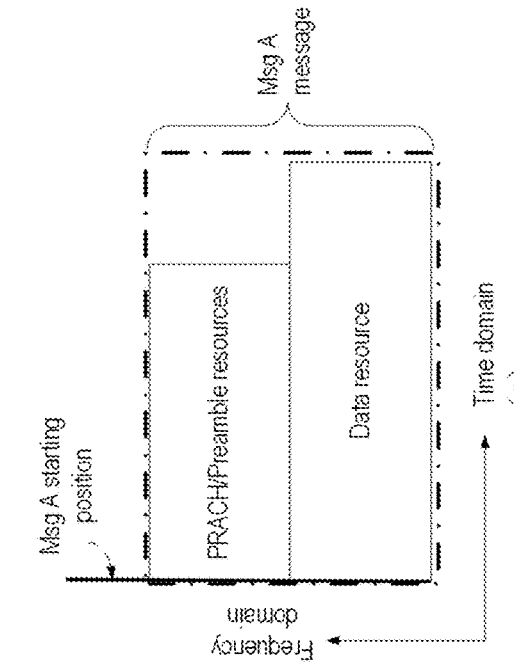
FIG. 7B
FIG. 7C
FIG. 7D

RANDOM ACCESS IN WIRELESS COMMUNICATION

CROSS-REFERENCE TO RELATED APPLICATIONS

This application is a continuation of International Patent Application No. PCT/CN2018/108466, filed on Sep. 28, 2018, the contents of which are incorporated herein by reference in their entirety.

TECHNICAL FIELD

The present document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

The present document describes techniques that can be used in various embodiments for random access to a wireless communication system.

In one example aspect, a method of wireless communication is disclosed. The method includes generating, by a wireless terminal, a transmission message including a preamble portion and a data portion, where transmission resources for the data portion are related to transmission resources for the preamble portion using a relationship rule, and transmitting the transmission message to a network-side device during a random access procedure.

In another example aspect, a method of wireless communication is disclosed. The method includes receiving, at a network-side device, during a random access procedure, a transmission message from a wireless terminal and determining, from the transmission message, a preamble portion and/or a data portion, where transmission resources for the data portion are related to transmission resources for the preamble portion using a relationship rule.

In yet another example aspect, a method of wireless communication is disclosed. The method includes generating, by a wireless terminal, a transmission portion structured to include at least one of a cyclic prefix (CP), a gap, a reference signal (RS), a data, and a control channel, according to a rule and transmitting the transmission portion to a network-side device during a random access procedure.

In yet another example aspect, a method of wireless communication is disclosed. The method includes receiving, at a network-side device, a transmission portion during a random access procedure being performed by a wireless terminal, and extracting, from a structure of the transmission portion based on a rule, at least some of a CP, a gap, an RS, a data, and a control channel.

In yet another aspect, one or more of the above-described methods may be implemented by a wireless communications apparatus that includes a processor.

In yet another aspect, the above-described methods may be embodied as processor-executable code and stored on a computer readable medium.

These, and other, features are described in the present document.

BRIEF DESCRIPTION OF THE DRAWINGS

FIG. 7B-7D shows an example relationship between preamble portion and data portion.

DETAILED DESCRIPTION

Figures 1A, 1B:
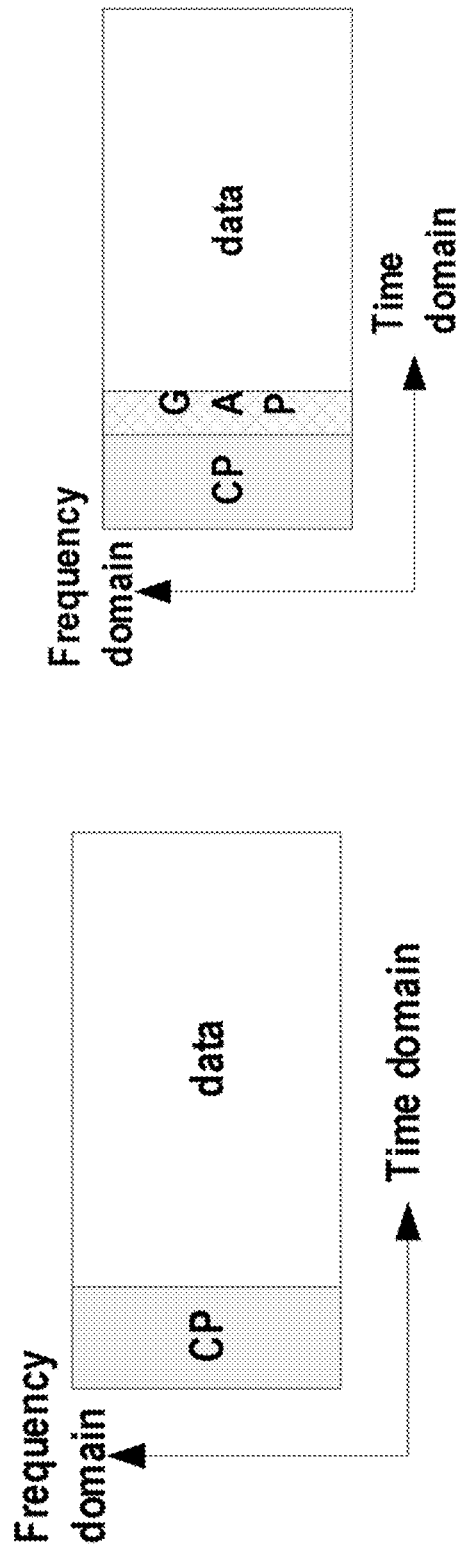
FIG. 1A-1B show example data transmission structures.

In wireless communication systems, random access is a procedure by which a user equipment (UE) are able to communicate with a network even when transmission resources are not specifically scheduled for the UE. A UE typically used random access procedure when the UE is attempting access a wireless network for a first time, or sporadically accesses the network or needs to communicate with the network without waiting for an available next dedicated transmission opportunity.

In Long Term Evolution (LTE), a four-step contention-based random access procedure has been supported, and four steps are required to complete random access procedure, resolve conflicts between different UEs (user equipment), and finally implement radio resource control (RRC) connection. The specific four-step contention-based random access procedure includes the following steps: Step 1: The terminal (UE) sends a preamble (preamble); Step 2: The evolved base station (eNodeB) sends a random access response (Random Access Response); Step 3: The UE sends a message three (Msg3); Step 4: The eNodeB sends a contention resolution.

For the ultra-reliable low latency communication (URLLC) scenario, for fast uplink synchronization and contention resolution, a smaller access delay is required. For the massive machine type communication (mMTC) scenario, for small packet transmission, the scheduling-free grant-free transmission can be used, and the uplink synchronization requirement is not high, and the traditional four-step contention-based random access procedure can be eliminated. For the unlicensed spectrum, if the traditional four-step contention-based random access procedure is adopted, each Msg message needs to be sent to perform an Listen-Before-talk (LBT) mechanism, which requires four LBT mechanisms to be executed for the four steps. Further, if the LBT detection channel is busy once in four times, the random access procedure cannot be completed, which increases the random access delay to some extent.

Due to this, in order to reduce the random access delay, reduce the signaling overhead, and reduce the power consumption of the device, it is advantageous to introduce a simplified random access procedure, or a two-step contention-based random access procedure to solve the above mentioned The problem. The simplified/two-step contention-based random crediting process may be as follows: Step 1: The terminal (UE) sends a preamble (preamble) portion and a data part, where the data part includes at least one of the following: a radio resource control connection request (Radio Resource Control, RRC Connection Request), RRC Resume Connection Request, RRC Reestablishment Connection Request, RRC Handover Confirm, (other) system message request, beam failure recovery request, data (packet), control channel (control information), UE ID Step 2: The base station sends a random access response (Random Access Response) and contention resolution to the terminal (UE).

In order to better support the simplified random access procedure, or the two-step contention-based random access procedure, it is useful to analyze the relation between the preamble (preamble) and the data part of the terminal (UE) in step 1, including structural design of these portions, and the way in which the two parts are mapped. Further, when multiple preamble resources or preamble indexes are associated with one data part resource, resource conflict or transmission interference problem caused by data transmission of different UEs on the same data resource may occur. The above discussion highlights the usefulness of solving these problems to better support the two-step random access process with low latency and low signaling overhead.

So far, there is still lack of an effective solution to the above problems. Accordingly, the present document provides techniques that can be used by embodiments to solve these problems, and others.

In one example aspect, the present document discloses a method for determining a transmission message resource in a two-step random access process based on contention, and/or a preamble and/or data in message A transmission of the two-step process. The resource structure design, and/or the mapping between the preamble and the data resources, helps to reduce resource conflicts between different UEs, and reduces random access delay, signaling overhead, and device power consumption.

Embodiment 1

This embodiment provides structures for the transmission of data portion. It may also be used for structure of data transmission in a physical uplink shared channel (PUSCH) transmission.

The data portion may be composed of at least one of the following components: a Cyclic Prefix (CP), a Gap, a Reference Signal (RS), data, and a control channel transmission. The data may be carried on a physical channel, and/or on a logical channel. Here, data portion can include one or more components. For example, the number of data portions can be one or more. CP, if present, can be at least one of the following: an extended CP, a normal CP, a specific CP. The length of the specific CP can larger than or smaller than that of the extended CP and/or normal CP.

In some embodiments, the data portion transmission structure is different according to the composition components in the data portion. In some embodiments, the composition of the data portion, and/or the time domain resource occupied by the components of the data may be combined with a preamble structure (or a preamble format), and/or occupied time duration for components of the preamble structure. For example, the composite structure, and/or, the composition components occupy the same time duration, or the partial components occupy different time durations (greater or smaller).

In some embodiments, the size of the resources (e.g., resource elements RE, or resource block RB, or symbols, or slot, or, subframe, etc.) occupied by the data may be fixed, or may be determined according to the size of the resource to be transmitted, or may be adjusted according to the information reported by the terminal/the data received by the base station (for example, semi-static adjustment, or, Dynamic Adjustment).

In some embodiments, the reference signal may be at least one of the following: a Demodulation Reference Signal (DMRS), a Sounding Reference Signal (SRS), and a Phase Tracking Reference Signal (PTRS). In some embodiments, the control channel may be at least one of: a Physical Uplink Control Channel (PUCCH) and a Physical Downlink Control Channel (PDCCH). In some embodiments, the data may be at least one of the following: an identifier (e.g., a UE ID, or a Cell Radio Network Temporary Identifier (C-RNTI), a specific X wireless network Temporary Identifier), X-RNTI), UE identity in the core network, or random number, or specific identifier), Radio Resource Control (RRC Connection Request), RRC Resume Connection Request, RRC Reestablishment Connection Request, RRC Handover Confirm, (other) system message request, beam failure recovery request, data (packet), control channel (control information).

The following describes several possible data part transfer structures.

Structure 1: The cyclic prefix CP+data part. As shown in FIG. 1A-1B, FIG. 1A is a schematic diagram of a data transmission structure composed of a cyclic prefix CP and data. Alternatively, the data portion may consist of at least one data unit. The CP can be introduced before data portion, and/or after, and/or the GT can be introduced after data portion. In some embodiments, a gap may be introduced before the data in the structure one. The Gap can be introduced after the CP, or before. FIG. 1B is a diagram showing the data transmission structure consisting of a cyclic prefix CP and gap and data.

Figures 2, 3:
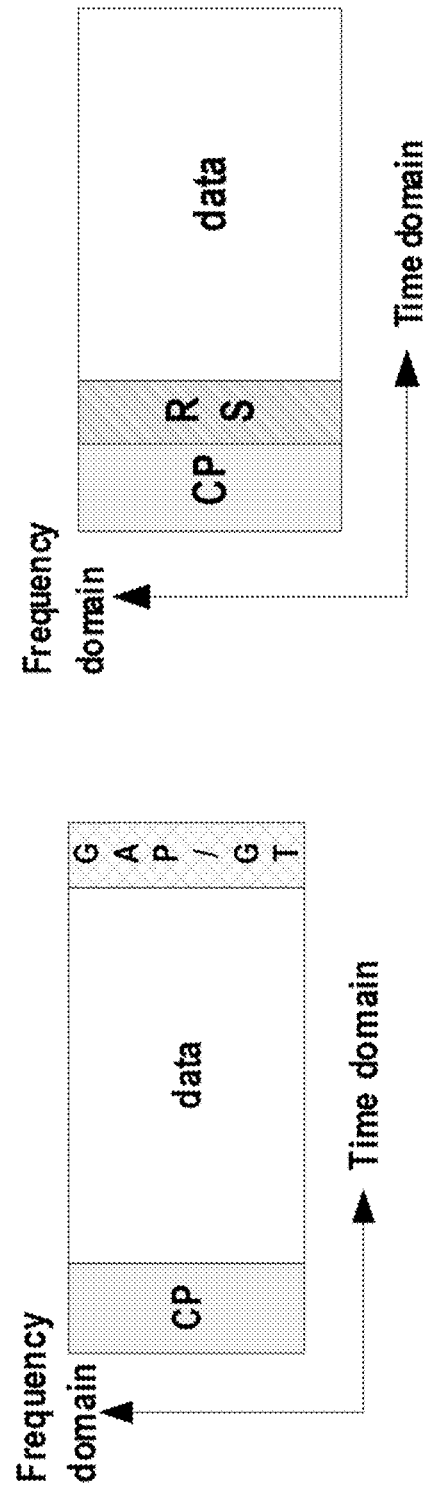
FIG. 2 shows another example data transmission structure.
FIG. 3 shows another example data transmission structure.

Structure 2: Cyclic prefix CP+data+Gap (or GT) part. As shown in FIG. 2, FIG. 2 is a schematic diagram of a data transmission structure composed of a cyclic prefix CP+data+Gap (or GT). Alternatively, the data portion may consist of at least one data unit. The CP can be introduced before data portion, and/or after, and/or the GT can be introduced after data portion. A gap may be introduced before the data structure. The Gap can be introduced after the CP, or before.

Structure 3: Cyclic prefix CP+reference signal RS+data portion. As shown in FIG. 3, FIG. 3 is a schematic diagram of a data transmission structure composed of a cyclic prefix CP+reference signal RS+data.

Alternatively, the reference signal may occupy consecutive symbols, or discrete symbols. The portion between the reference signals, or before and/or after the reference channel, may be gap (or GT), and/or, CP, and/or, data. Alternatively, the data portion may consist of at least one data unit. Alternatively, the data portion may consist of at least one data unit. The CP can be introduced before data portion, and/or after, and/or the GT can be introduced after data portion. A gap may be introduced before the data structure. The Gap can be introduced after the CP, or before.

Structure 4: Cyclic prefix CP+reference signal RS+data+Gap (or GT) part.

Figures 4, 5:
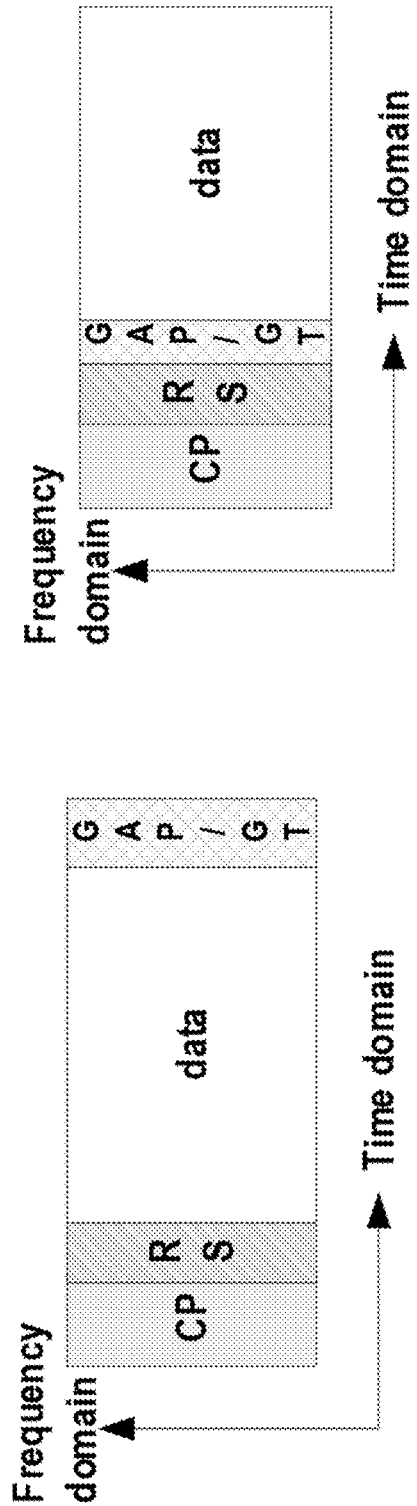
FIG. 4 shows another example data transmission structure.
FIG. 5 shows another example data transmission structure.

As shown in FIG. 4, FIG. 4 is a schematic diagram of a data transmission structure composed of a cyclic prefix CP+reference signal RS+data+Gap (or GT).

Alternatively, the data portion may consist of at least one data unit. The CP can be introduced before data portion, and/or after, and/or the GT can be introduced after data portion. A gap may be introduced before the data structure. The gap can be introduced after the CP, or before. Alternatively, the reference signal may occupy consecutive symbols, or discrete symbols. The portion between the reference signals, or before and/or after the reference channel, may be gap (or GT), and/or, CP, and/or, data.

Structure 5: Cyclic prefix CP+reference signal RS+Gap (or GT)+data portion. As shown in FIG. 5, FIG. 5 is a schematic diagram of a data transmission structure composed of a cyclic prefix CP+reference signal RS+Gap (or GT)+data. Alternatively, the reference signal may occupy consecutive symbols, or discrete symbols.

Structure 6: Based on Structure 5, the data portion is previously introduced into the CP, and/or the data portion is later introduced into Gap (or GT). Based on this, In some embodiments, the reference signal portion of the structure six is preceded, and/or, after which there is no Gap, and/or GT. Alternatively, the data portion may consist of at least one data unit.

Figures 6, 7A:
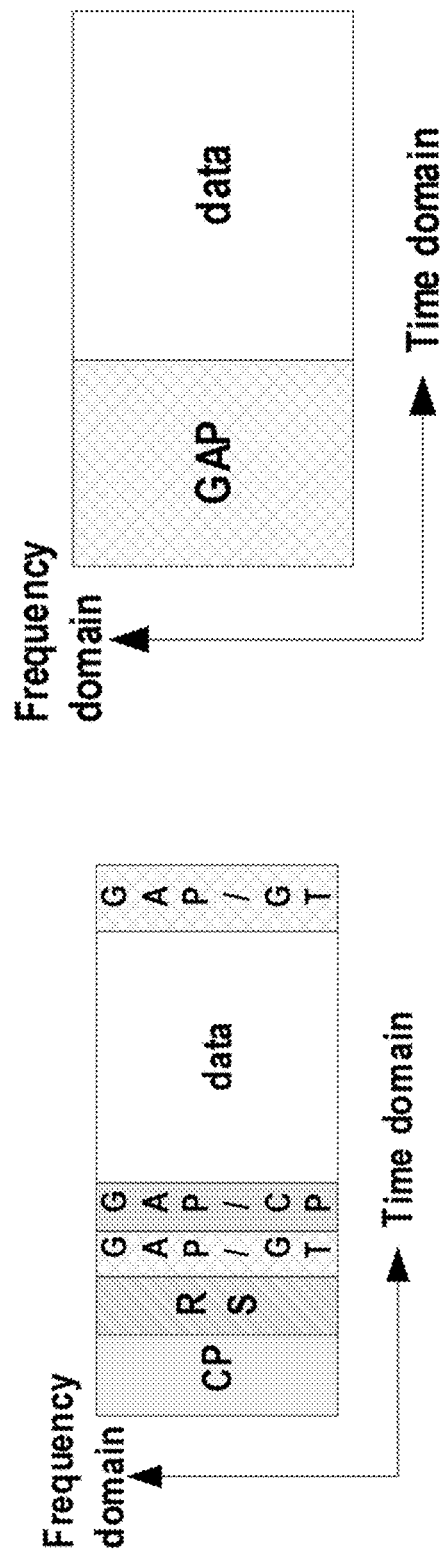
FIG. 6 shows another example data transmission structure.
FIG. 7A shows another example data transmission structure.

As shown in FIG. 6, FIG. 6 is a schematic diagram of a data transmission structure composed of a reference signal, and a data portion previously introduced into a CP (or Gap), and then introduced into a GT (or Gap).

Structure 7: Gap+data part. As shown in FIG. 7A, FIG. 7A is a schematic diagram of a data transmission structure composed of Gap+data. Alternatively, the data portion may consist of at least one data unit. In some embodiments, the data portion is previously introduced into the CP, and/or the data portion is followed by a Gap (or GT). In some embodiments, the data portion can introduce a reference signal. A gap or CP can be introduced/inserted before the reference signal, and/or, after the reference signal.

Structure eight: only the data part. In some embodiments, the data portion can introduce or include a reference signal. A gap or CP can be introduced/inserted before the reference signal, and/or, after the reference signal a Gap or GT may be introduced. Similarly, A gap or CP can be introduced/inserted before the data, and/or, after the data a Gap or GT may be introduced.

The cyclic prefix CP in the above structure can be replaced with Gap. In some embodiments, at least one of the above structures may be one or more. Here, the data part structure design is not listed one by one, but the combination of at least one of the data part components is within the scope of the patent protection, and the composition component may be one or more.

The data Transport Block TB (resource) size, the data structure, the data structure component, and the data structure component occupy the number of time domain resources (e.g., symbols, or subframes, or slots, or minislots, or REs, or RBs, or subband, or BWP, or CC), At least one of the starting position of the data structure component and the end position of the data structure component, at least one of the starting position of data structure and the ending position of data structure, subcarrier space SCS for data structure may be obtained by at least one of the following: high-level RRC signaling, physical layer DCI signaling, MAC layer signaling, and predefined manner.

For example, the Data portion includes at least one of the following: a Reference Signal (RS), data, and a control channel. CP and/or gap can be introduced/inserted before at least one of RS and data and control channel, and/or, GT and/or gap can be introduced/inserted after at least one of RS and data and control channel.

Embodiment 2

This embodiment provides a relationship between a preamble portion and data portion. In some embodiments, the preamble and data portions may be configured as a whole, or the preamble and data portions may each have their own structure. The preamble and data portions may be at least one of: time division multiplexing, frequency division multiplexing, space division multiplexing. In the following solution, the frequency division multiplexing relationship between the preamble and the data resource, where the data resource location may be located in the direction in which the frequency domain resource index of the preamble resource is incremented, or may be direction of decreasing frequency domain resource index direction. In some embodiments, the preamble and the data resource may be located in the same bandwidth part BWP or CC, or different BWP/CC.

For the frequency division multiplexing between the preamble and the data portion, at least one of the following structures is included:

Structure 1: preamble and data part adopt frequency division multiplexing in the frequency domain, and the time domain starting position is the same.

As shown in FIG. 7B is a schematic diagram of frequency division multiplexing between a preamble and a data resource in an MsgA message and having the same start position in the time domain. It is illustrated in FIG. 7B that the data resource is the same as the preamble resource in the time domain. Alternatively, the time domain length/end position of data resource and preamble resource may be the same, or different. For example, the data resource may be smaller than (e.g., FIG. 7C) or larger than the preamble resource (e.g., FIG. 7D).

Figure 14:
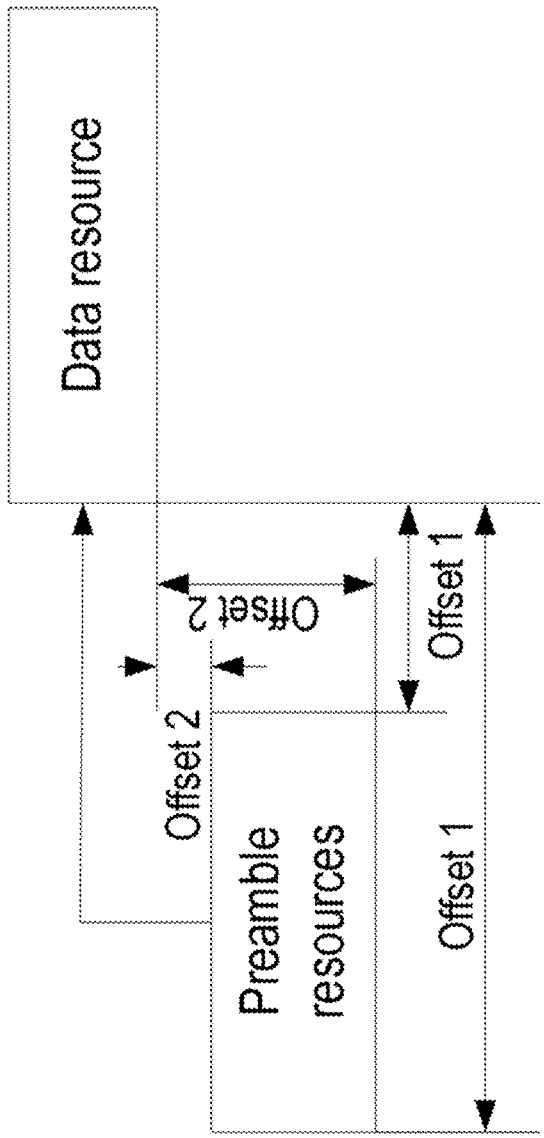
FIG. 14 shows an example relationship between preamble portion and data portion.

Structure 2: The difference with the structure 1 is that in the frequency domain, an offset or Gap or guardband is introduced between the preamble resource and the data part. In some embodiments, the relationship of data resource and preamble resource can be determined by offset 2 (e.g., as shown in FIG. 14) or gap or guardband in the frequency domain. offset 2 or gap or guardband is based on the starting/ending position of transmission resource for Preamble portion in the frequency domain.

Figure 8:
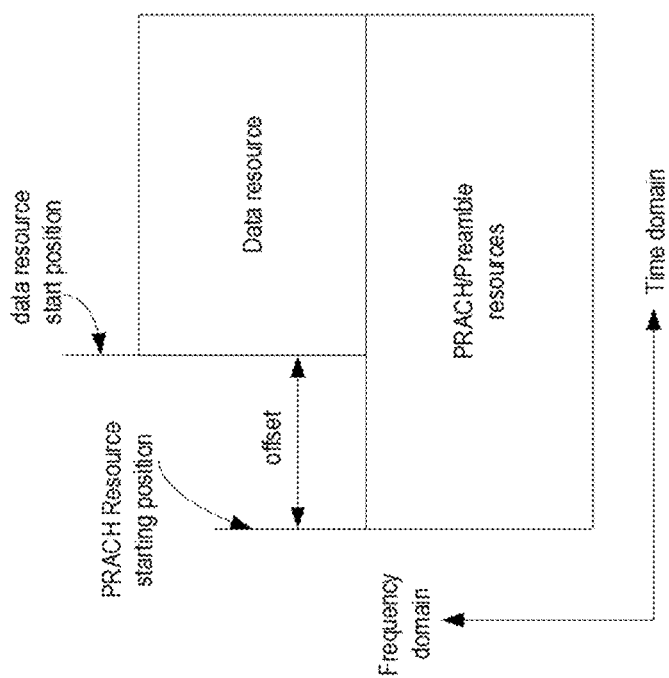
FIG. 8 shows an example relationship between preamble portion and data portion.

Structure 3: The difference with structure 2 is that offset 1 (e.g., as shown in FIG. 14) is introduced in the time domain. Offset 1 is based on the starting/ending position of transmission resource for Preamble portion in the time domain. As shown in FIG. 8, FIG. 8 is a schematic diagram of frequency division multiplexing between a preamble and a data resource in an MsgA message and introducing an offset between time domain start positions. Alternatively, the time domain end positions of the data portion and the preamble portion may be the same, or different. For example, the data resource end position may be smaller than, or greater than, the preamble resource end position. In some embodiments, the preamble starting position is the same as the data resource starting position, and the data transmission starting position is starting from a position corresponding to the time domain offset. The offset position from the preamble start location to the data resource may be vacant, or blank, or the cyclic prefix CP.

Structure 4: The difference from structure 3 is that in frequency domain, an offset or Gap or guardband is introduced between the preamble resource and the data portion.

Structure 5: Based on one of the structures in this embodiment, CP length of the data portion is same as CP length of preamble structure. Or the same length of the CP of the preamble and the data part in the MsgA message. An offset may be introduced between the start positions of the time domain.

Figure 9:
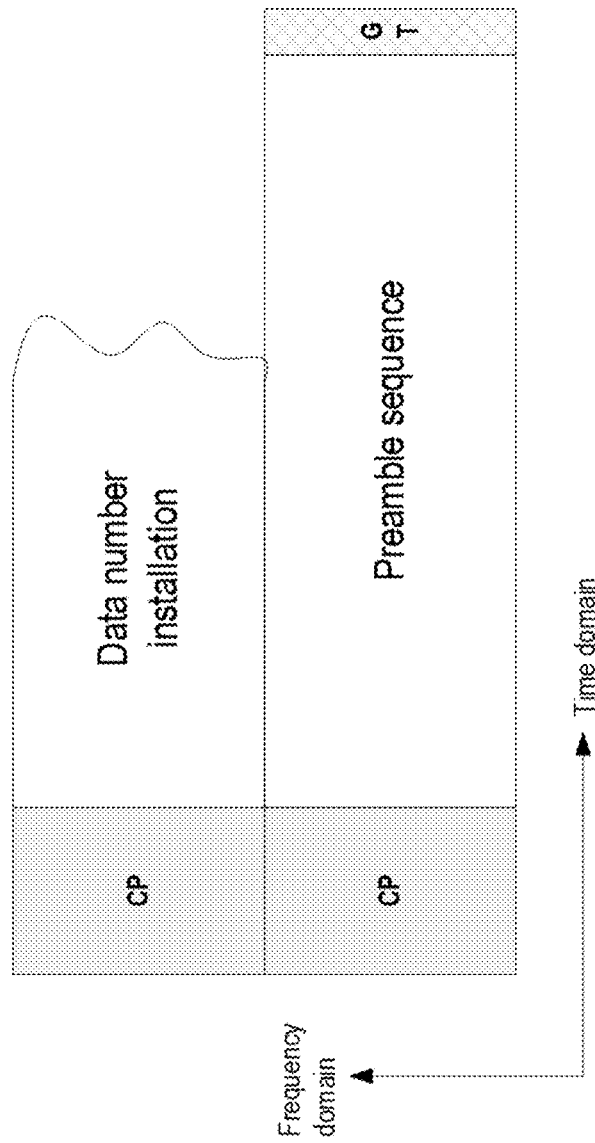
FIG. 9 shows an example relationship between preamble portion and data portion.
Figure 10:
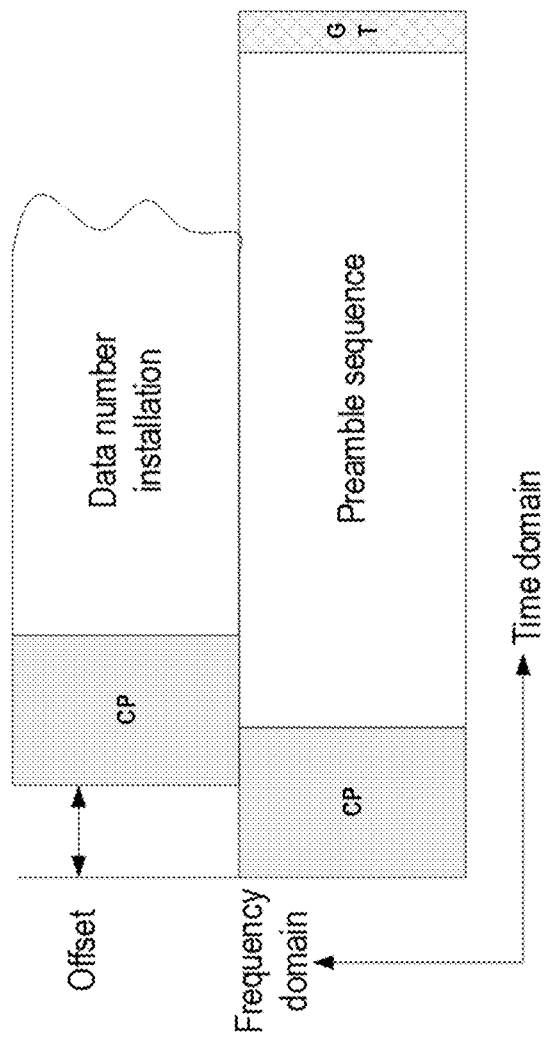
FIG. 10 shows an example relationship between preamble portion and data portion.

As shown in FIG. 9, which is a schematic diagram showing the same length of the CP of the preamble and the data portion in the MsgA message. FIG. 10 is a schematic diagram showing the same length of the CP of the preamble and the data part in the MsgA message, and introducing an offset between the start positions of the time domain. The preamble portion may be a single or multiple portions. CP can be introduced before preamble portion, and/or GT can be introduced after preamble portion. The data portion may also be one or multiple portions. CP or Gap can be introduced before data portion, and/or GT or Gap can be introduced after data portion.

Structure 6: Based on one of the structures in this embodiment 1, the data portion uses a long CP (e.g., a specific CP). The length CP is greater than a regular CP length, or an extended CP length. The CP of the data portion is not associated with the CP of the preamble format.

Structure 7: Both the preamble and the data resource adopt an interleaving unit structure, and the preamble and the data part occupy different interleaving units. In some embodiments, if preamble and data is TDM, interlacing unit used by preamble portion and/or data portion is not limited.

Specifically, the interleaving unit may be a physical resource block PRB level, or a resource particle RE level, or a subPRB level. Assuming that the number of interleaved units is N, the number of resources included in the interleaved unit is M. At least one of the starting position of the interleaving unit and/or the length of the interleaving unit and/or the ending position of the interleaving unit and/or the starting position of resource in a interleaving unit and/or the resource interval in a interleaving unit and/or the length of resource in a interleaving unit and/or the ending position of resource in a interleaving unit, and/or M, and/or N may be obtained by at least one of the following: high layer RRC signaling, physical layer DCI signaling, MAC layer signaling, and a predefined manner. In some embodiments, the preamble, and/or the data resource may use at least one of the interleaving units 0, 1, 2 . . . etc.

Figure 11:
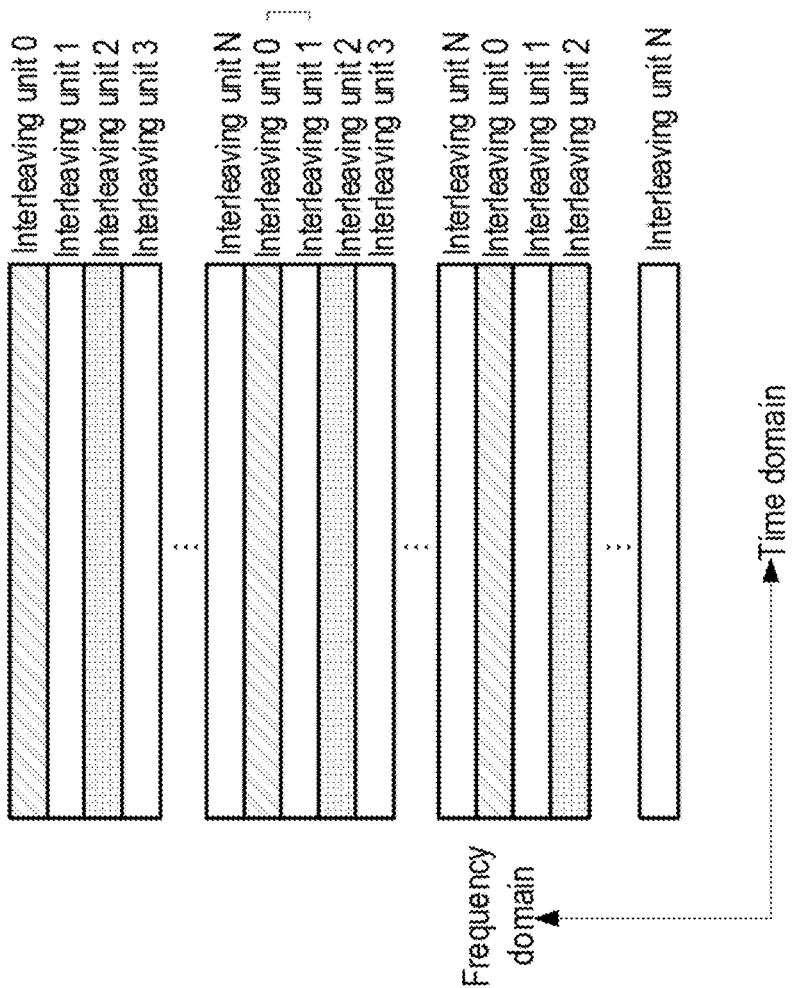
FIG. 11 shows an example relationship between preamble portion and data portion.

As shown in FIG. 11, which is a schematic diagram 1 of a frequency division multiplexing (FDM) mode between a preamble resource and a data resource and adopting an interleaving structure design. As can be seen from FIG. 11, the preamble transmits on the resource corresponding to the interleave unit 0, and the data part is transmitted on the resource corresponding to the interleave unit 2. It can also be seen that the interleaved unit allocated for the PRACH/preamble and the interleaved unit allocated for the data portion are discontinuous in the frequency domain. Alternatively, adjacent interleaved units may also be configured.

In some embodiments, for the case where the data part occupies less resources than the number of resources in the interleaved unit, at least one of an offset/starting position, an end position, a continuous length, an interval, and a number of occupied resources in the interleaving unit may be introduced. Determine the transmission location of the specific data in the frequency domain. In some embodiments, if the data portion occupies less resources, a smaller number of interleaving units N may be configured.

The number N of the interleaving units, and the number M of resources included in each interleave unit may be determined by at least one of the following methods: predefined, according to the data resource size, determined according to compatibility/structural design with other uplink channels, according to preamble The frequency domain occupies the resource size.

The starting position of the interleaving unit 0 may have an offset based on the configured bandwidth.

Structure 8: One of the preamble and data resources adopts an interleaved unit structure, and preamble or data is transmitted in an unconfigured resource within bandwidth.

Figure 12:
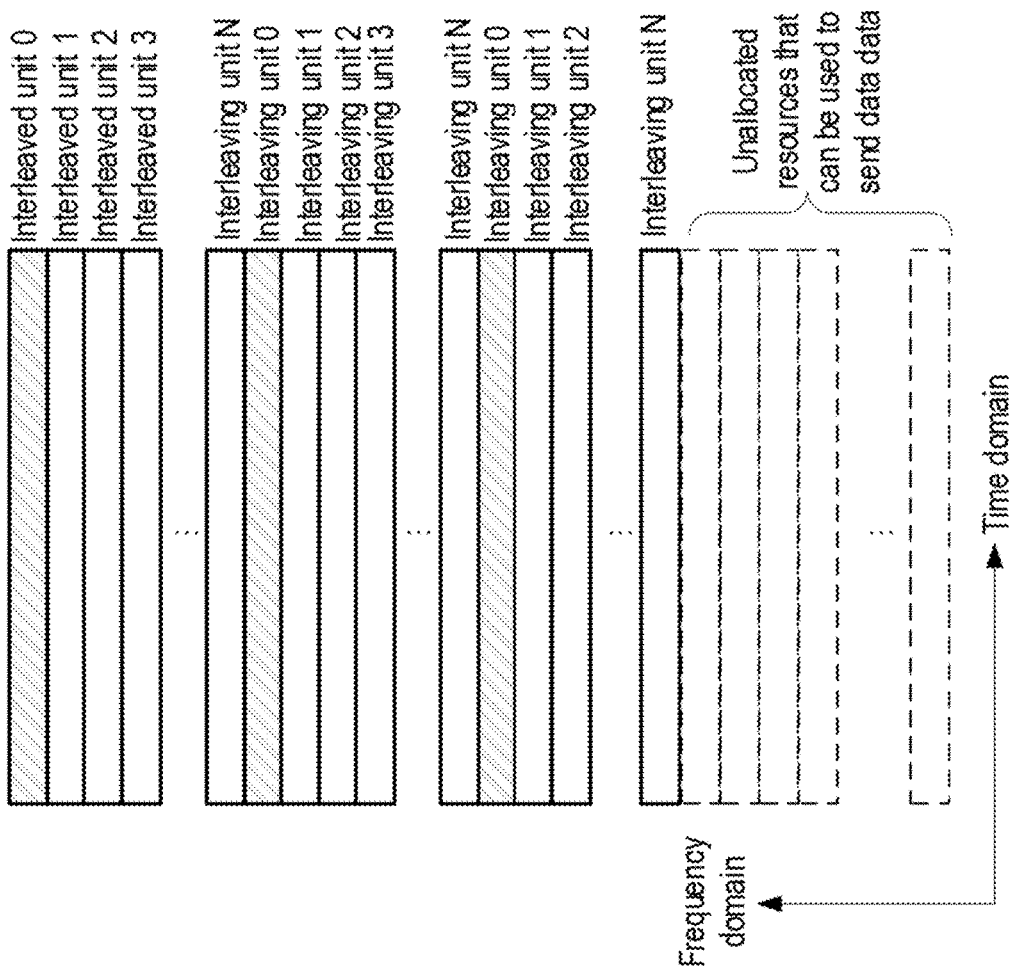
FIG. 12 shows an example relationship between preamble portion and data portion.

This structure is different from the structure 7 shown in FIG. 11, as shown in FIG. 12. FIG. 12 is a schematic diagram 1 of an FDM multiplexing mode between preamble resources and data resources, and preamble or data is designed by using an interleaving structure. The number of resources (PRB, or RE) corresponding to the configured bandwidth may not be completely divisible by N, or M, the remaining resources that is not divided can be vacant (unused) or used exclusively to send data parts or preambles.

For example, in some implementations, the preamble uses an interleaved structure for transmission. When the resources corresponding to the configured frequency domain bandwidth cannot be divisible by N and/or M, the remaining resources in the frequency domain can be used for data portion transmission. In the remaining resource portion, the data may be continuously allocated/transmitted in the frequency domain, and/or the frequency domain is transmitted according to a certain pattern. at least one of an offset/starting position, an end position, a continuous length, an interval, and a number of occupied resources In the remaining resource portion may be introduced to determine the transmission location of the data in the frequency domain. At least one of a frequency domain start position, a frequency domain pattern, a frequency domain interval, a frequency domain occupied resource number, a resource continuous allocation, or a discontinuous allocation mode may be determined by at least one of the following: high layer RRC signaling, physical Layer DCI signaling, MAC layer signaling, predefined mode, bitmap.

The starting position of the interleaving unit 0 may have an offset based on the configured bandwidth. Alternatively, unallocated resources may be distributed on both sides, or one side in the interleaving unit.

In some embodiments disclosed in the present document, at least one of the common starting position of the preamble and the data portion, the starting position of the data portion, the ending position of the data portion, and offset 1, and offset 2, and whether CP and/or GT of preamble is the same as CP and/or GP of data part, and whether data part introduces long CP, and whether Gap is introduced before the data part, and GT/Gap is introduced after the data part, and the data transmission structure, and the CP length of the data part, and the GT length of the data part, and the Gap lengths of the data part, and N, and M can obtained by at least one of the following: high-level RRC signaling, physical layer DCI signaling, MAC layer signaling, predefined mode, bitmap. The above length can also be expressed as a starting position, and/or an ending position.

The data portion structured described on the above embodiment 1 are also applicable to the data portion of the MsgA message in two-step random access procedure.

Embodiment 3

In this embodiment, a time division multiplexing structure between a preamble and a data portion are provided.

Structure 1: The preamble is time-division multiplexed with the data portion, and there is no gap between the ending position of the preamble and the starting position of data portion.

Structure 2: The preamble is time-division multiplexed with the data portion, and a time domain offset 1 is introduced between the start position/end position of the preamble and the starting of data portion.

Structure 3: Based on one of the above structures, the long CP (specific CP) and/or gap is introduced before the data portion, and/or, GT or gap is introduced after the data portion.

Structure 4: In the time domain, CP and/or GT length of the preamble can be same as CP and/or GT of the data portion.

Figure 13:
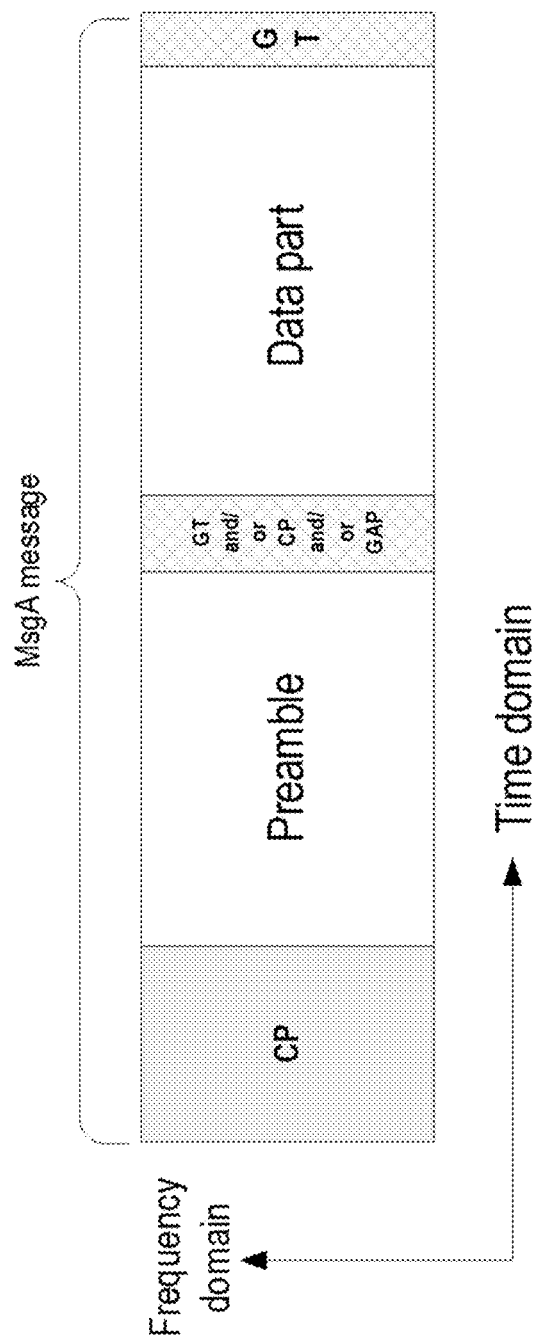
FIG. 13 shows an example relationship between preamble portion and data portion.

Structure 5: In the preamble structure, the data portion is introduced. In some embodiments, data may replace a portion of the original preamble sequence or modify existing the preamble time domain structure. As shown in FIG. 13, which is a schematic diagram of time division multiplexing of preamble and data portions. In some embodiments, the CP, and/or GT, and/or gap of the data portion may be different (greater than, or less than), or not associated with the CP, and/or GT of the preamble structure. In some embodiments, the data portion is part of the preamble format.

In some embodiments, similar to structure 7 or 8 in the embodiment 3, at least one of the preamble and data portions may adopt an interleaved unit structure manner.

In this embodiment, at least one of the offset 1, offset 2 in frequency domain, or the time domain structure of the MsgA, the preamble sequence length are used. In some examples, SCS of preamble, SCS of data part, whether data SCS and preamble SCS are the same, CP of data part, gap of data part, GT of data part, whether data and/or preamble adopt the same beam direction, whether data and the preamble uses the same transmit powers, transmit power offset for data and preamble, the starting position of data portion, whether data and the preamble uses the same CP length, GT length, N, M, the starting position of the interleaving unit, the length of the interleaving unit, the ending position of the interleaving unit, the starting position of resource in a interleaving unit, the resource interval in a interleaving unit, the length of resource in a interleaving unit, the ending position of resource in a interleaving unit can be determined by at least one of the following: high layer RRC signaling, physical layer DCI signaling, MAC layer signaling, a predefined manner, and a bitmap.

In the present document, the preamble and/or data in the MsgA message may use the same beam direction or use different beam directions. In some embodiments, the preamble and/or data use different transmit powers, or the same transmit power.

Embodiment 4

This embodiment provides a mapping/correspondence relationship between a preamble resource and a data resource. In some embodiments, an offset 1 is introduced between the preamble resource and the start position of the data resource in the time domain. In the frequency domain, an offset 2 is introduced between the preamble resource and the starting position of the data resource. At least one of the offset 1 and the offset 2 may be a positive integer greater than, or equal to 0. The granularity of the positive integer may be PRB, or RE, or RBG, or REG, or BWP, or subband. Here, the offset 1, or offset 2 may be based on the start position of the preamble, or the end position as a reference, as shown in FIG. 14.

In some embodiments, the parameter X indicates that the X preamble resources are associated with one data resource. The associated data resource may have a fixed resource size, and/or a variable resource size, and/or a set of resource sizes. If X=1, it means that a preamble resource is associated with a data resource. If X>1, it means that X preamble resources are associated with one data resource. If X<1, it means that a preamble resource is associated with 1/X data resources.

At least one of the parameter X, the offset 1 and the offset 2 may be obtained by at least one of the following: high-layer RRC signaling, physical layer DCI signaling, MAC layer signaling, predefined mode, bitmap. The high layer RRC signaling may be the remaining system information RMSI, and/or other system information SI.

The mapping/correspondence between the preamble resource and the data resource is in accordance with at least one of the following: in increasing or decreasing order of Preamble resource indexes within one PUSCH resource; in increasing or decreasing order of frequency resource indexes for frequency multiplexed PUSCH resource; in increasing order of indexes for PUSCH resource in the time domain.

In some embodiments, in the frequency domain, the number of preamble resources is S1, and the number of Data resources is S. In the time domain, the number of preamble resources is S2. Where S1, S2, and S are positive integers greater than zero. The mapping scheme is exemplified based on the method described in the mapping/correspondence between the preamble resource and the data resource. Note that only a few typical cases are illustrated here to illustrate the method, but it is not limited to the case of the following examples, and other similar methods are within the scope of the present invention.

Example 1

Figure 15:
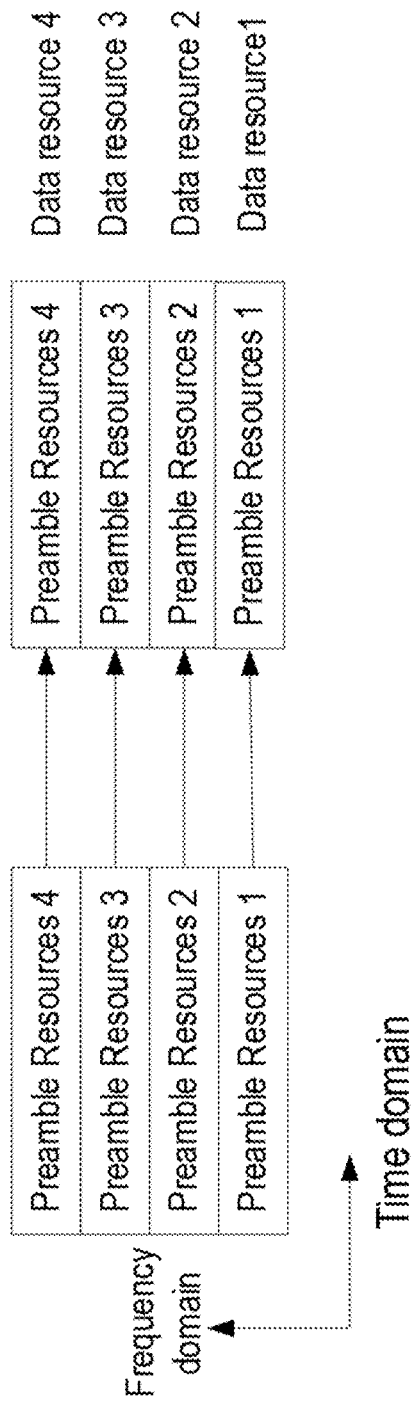
FIG. 15 shows an example of preamble indexes used for random access transmissions.
Figure 16:
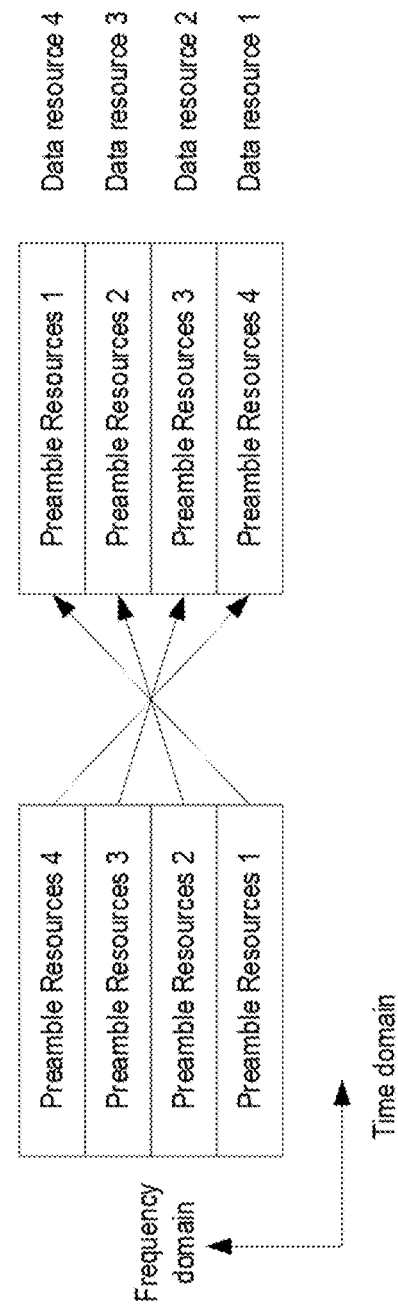
FIG. 16 shows an example of mapping between preamble indexes and data portions.

In the Frequency Domain, the Number of Data Resources is 4, and the number of preamble resources is 4. When X is 1, the preamble resources are mapped in the order of increasing on the data resources. As shown in FIG. 15, FIG. 15 is a schematic diagram of X=1 and preamble resources are mapped in order of increasing index on data resources. FIG. 16 is a schematic diagram 1 in which X=1 and preamble resources are mapped in descending order on data resources.

Example 2

Figure 17:
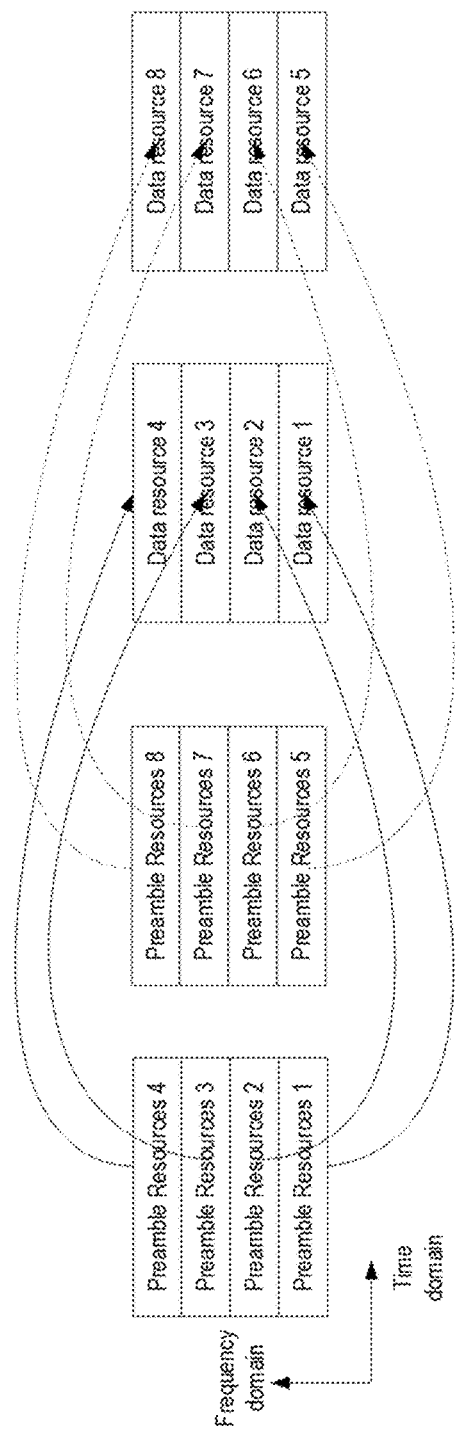
FIG. 17 shows an example of mapping between preamble indexes and data portions.

In the frequency domain, the number of data resources is 4, and the number of preamble resources is 4. In the time domain, the number of data resources is 2, and the preamble resource is 2. When X is 1, the preamble resources are mapped in the order of increasing on the data resources. And, the data resources are in ascending order on the time domain. FIG. 17 is a schematic diagram 2 showing that X is 1 and preamble resources are mapped in descending order on data resources.

Example 3

Figure 18:
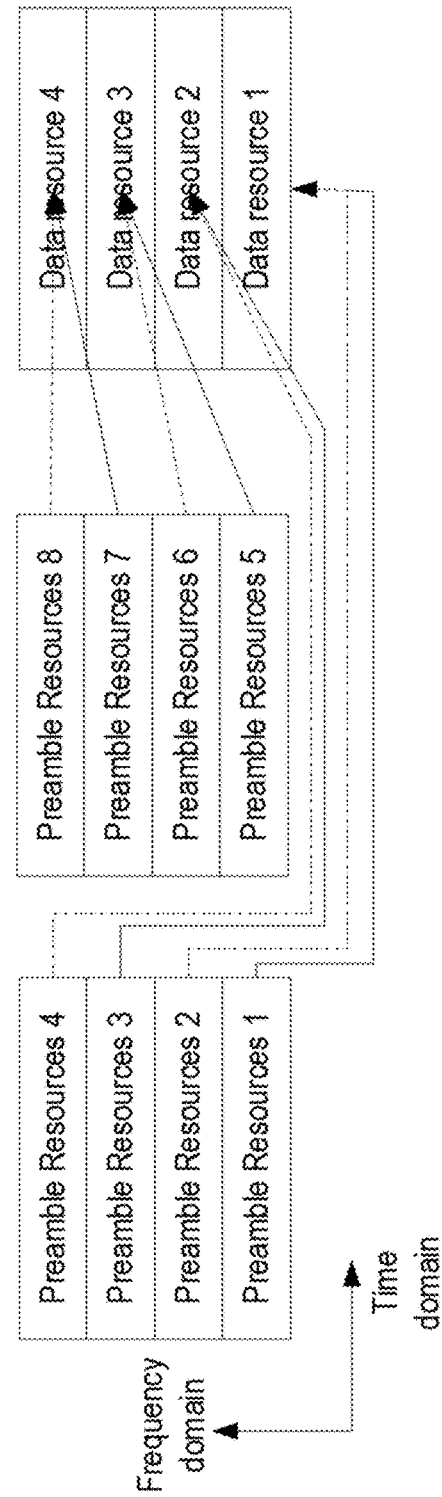
FIG. 18 shows an example of mapping between preamble indexes and data portions.

In the frequency domain, the number of data resources is 4, and the number of preamble resources is 4. When X is 2, the preamble resources are mapped in the order of increasing on the data resources. As shown in FIG. 18, two preamble resources are mapped/mapped with one data resource. FIG. 18 is a schematic diagram showing that X is 2 and preamble resources are mapped in descending order on data resources.

Example 4

Figure 19:
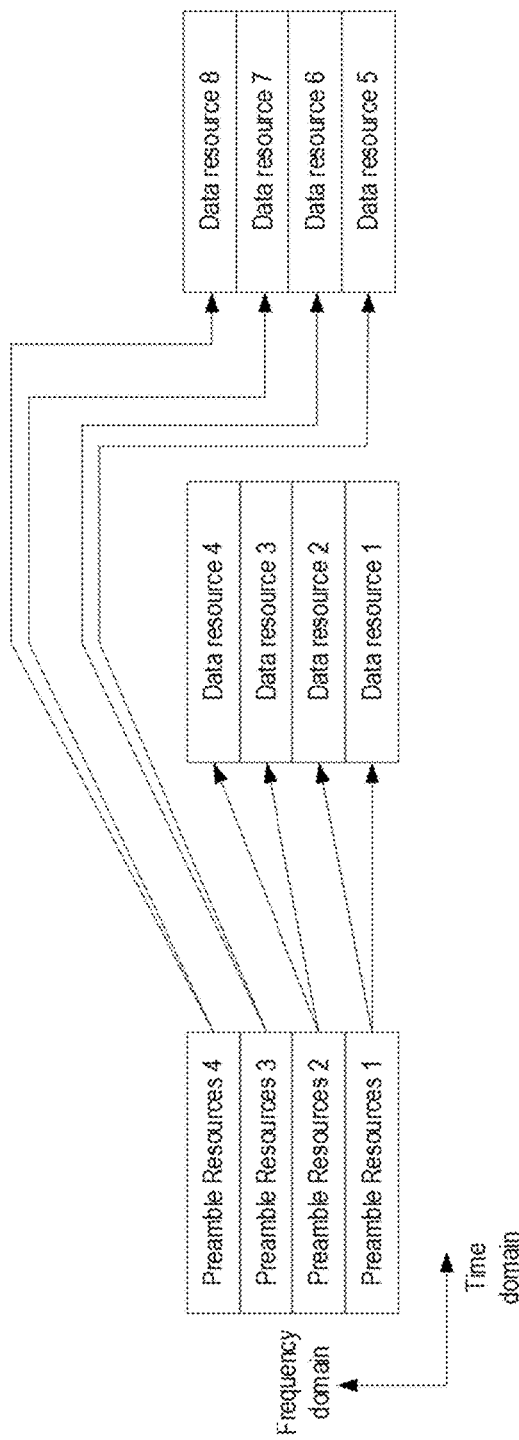
FIG. 19 shows an example of mapping between preamble indexes and data portions.

In the frequency domain, the number of data resources is 4, and the number of preamble resources is 4. When X is ½, the preamble resources are mapped in the order of increasing on the data resources. As shown in FIG. 19, one preamble resource is mapped with two data resources. FIG. 19 is a diagram showing that X is ½ and preamble resources are mapped in increasing order on data resources.

In some embodiments, the above mapping manner, and the association relationship, are also applicable to the preamble resource group, and/or the Data resource group.

In some embodiments, the parameter X1 indicates that the X1 preamble resource groups are associated with one data resource. The associated data resource may have a fixed resource size, and/or a variable resource size, and/or a set of resource sizes. If X1=1, it means that a preamble resource group is associated with a data resource. If X1>1, it means that X1 preamble resource groups are associated with one data resource. If X1<1, it means that a preamble resource group is associated with 1/X1 data resources.

The mapping/correspondence between the preamble resource group and the data resource is in accordance with at least one of the following: in a data resource, the preamble resource group index is incremented or decremented; the data resource is in the increasing order, or, decreasing order in the frequency domain; data resources are in ascending order on the time domain. In some embodiments, preamble resource index in the preamble resource group and data resource mapping rule can refer to preamble resource and data resource mapping rule.

In some embodiments, the parameter X2 indicates that the X2 preamble resources are associated with one data resource group. At least one of the resource data and the data resource size in the data resource group may be fixed, and/or variable. If X2=1, it means that a preamble resource is associated with a data resource group. If X2>1, it means that X2 preamble resources are associated with one data resource group. If X2<1, it means that one preamble resource is associated with 1/X2 data resource groups.

The mapping/correspondence between the preamble resource and the data resource group is in accordance with at least one of the following: in a data resource, the preamble resource index is incremented or decremented; the data resource is incremented according to the frequency domain, or, the descending order; the data resource group is incremented according to the frequency domain, or, in descending order; the data resources are in increasing order in the time domain; the data resource groups are in increasing order in the time domain. In some embodiments, preamble resource and data resource in the data resource group mapping rule is in accordance with at least one of the following: increasing or decreasing order in the frequency domain; increasing order in the time domain.

In some embodiments, parameter X3 indicates that X3 preamble resource groups are associated with one data resource group. The number of preamble resources included in each preamble resource group may be the same, and/or different. At least one of the resource data and the resource size in the data resource group may be fixed, and/or variable. If X3=1, it means that a preamble resource group is associated with a data resource group. If X3>1, it means that X3 preamble resource groups are associated with one data resource group. If X3<1, it means that one preamble resource group is associated with 1/X3 data resource groups.

The mapping/correspondence between the preamble resource group and the data resource group is in accordance with at least one of the following: in a data resource group, the preamble resource index in the preamble resource group is incremented or decremented; preamble resource group index is in the order of increment, or decrement; data resources are decremented in the frequency domain, or in descending order; data resource groups are incremented, or decremented in the frequency domain; data resources are in increasing order in time domain; data resource groups are in increasing order in time domain.

At least one of the parameters X, X1, X2, X3, offset 1, and offset 2 may be obtained by at least one of the following: high-layer RRC signaling, physical layer DCI signaling, MAC layer signaling, and pre-Define the way, bitmap. The high layer RRC signaling may be the remaining system information RMSI, and/or other system information SI.

In some embodiments, the mapping/correspondence between the preamble resource and the data resource includes at least one of the following: The preamble resource/index corresponding to at least one of the preamble resource time domain index, the preamble resource time domain interval, the preamble time domain resource number, and the preamble continuous time domain resource in increasing or decreasing order are mapped/corresponding the time domain resources in increasing or decreasing order; the data time domain resources are in ascending order.

In addition to the above mapping manners, this embodiment provides some other mapping methods, as follows:

For the preamble resource i and the data resource j, there is a one-to-one mapping/correspondence relationship, and the i and j may be the same or different (greater than, or less than). The one-to-one mapping relationship may be determined by at least one of the following methods:

Option 1: one-to-one mapping/correspondence between the preamble resource index i and the data resource index i;

Option 2: One-to-one mapping/correspondence between the preamble resource index i and the data resource index S-i or S-1-i.

Figure 20:
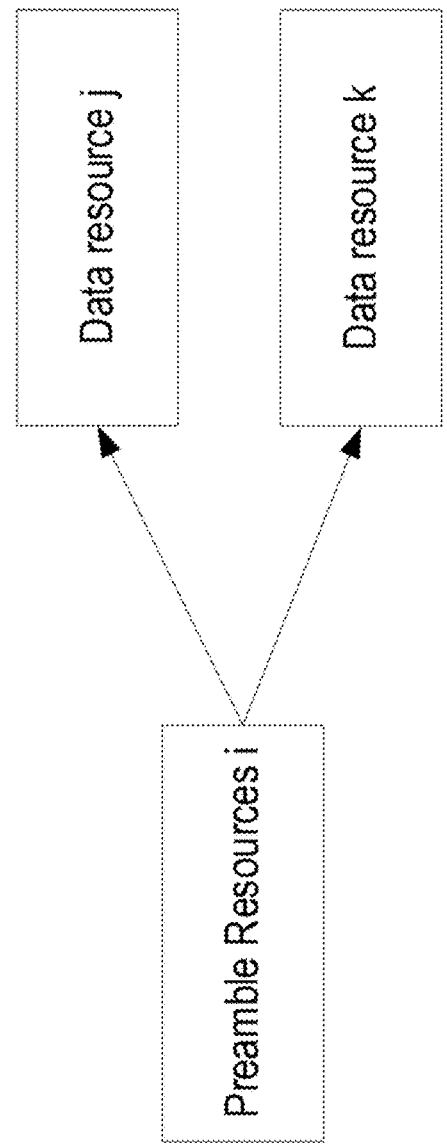
FIG. 20 shows an example of mapping between preamble indexes and data portions.

Provide a one to X mapping/correspondence relationship between the preamble resource and the data resource. FIG. 20 is a schematic diagram of a one-to-two mapping/correspondence relationship between a preamble resource and a data resource.

Provide a one to X mapping relationships may be determined by at least one of the following ways:

Option 1: preamble resource index i=data resource index j mod preamble resource number.

Figure 21:
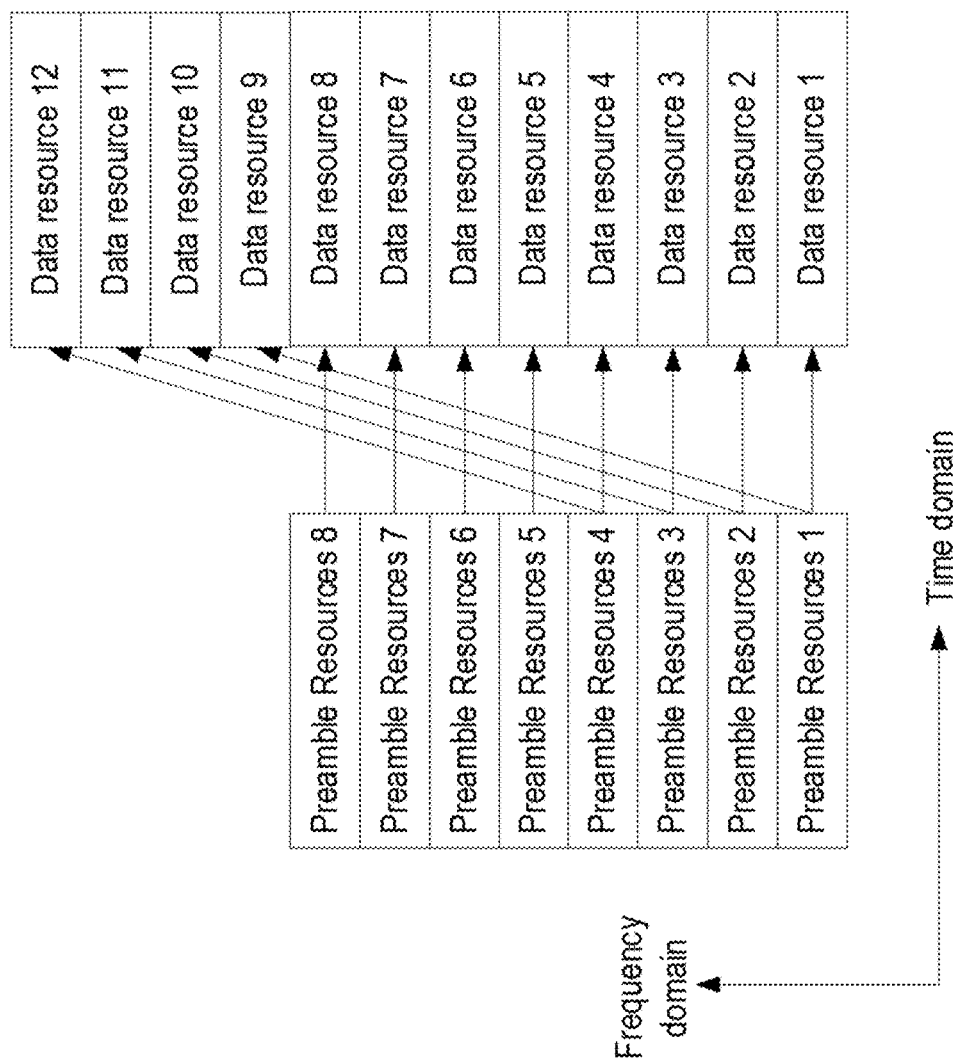
FIG. 21 shows an example of mapping between preamble indexes and data portions.

For example, the number of preamble resources is 8, and the index of preamble resources is 1, 2, 3, 4, 5, 6, 7, 8. The number of data resources is 12, and the data resource indexes are 1, 2, 3, 4, 5, 6, 7, 8, 9, 10, 11, 12. According to the preamble resource index i=data resource index j mod preamble resource number, the preamble resource index 1 corresponds to the data resource index 1, 9, the preamble resource index 2 corresponds to the data resource index 2, 10, and the preamble resource index 3 and The data resource index 3, 11 corresponds to the preamble resource index 4 corresponding to the data resource index 4, 12, the preamble resource index 5 corresponds to the data resource index 5, the preamble resource index 6 corresponds to the data resource index 6, and the preamble resource index 7 corresponds to the data resource index 7, and the preamble resource index 8 corresponds to the data resource index 8, as shown in FIG. 21. In some embodiments, the preamble resource, and/or the data resource may not be limited to the frequency division shown in the schematic diagram or may be a time division manner.

Option 2: preamble resource index i=(data resource index j+random number) mod preamble resource number.

An X-to-one mapping/correspondence relationship between the preamble resource and the data resource. The X-to-one mapping relationship may be determined by at least one of the following: t preamble resources as one group in turn mappings to the data resources according to increasing or decreasing order in time domain; according to increasing or decreasing order in the frequency domain. In some embodiments, An Y-to-one mapping/correspondence relationship between the preamble index and the data resource. The Y-to-one mapping relationship may be determined by at least one of the following: t1 preamble index as one group in turn mappings to the data resources according to increasing or decreasing order in time domain; according to increasing or decreasing order in the frequency domain.

In some embodiments, the preamble index/resource and data resource mapping rule may reuse the association method between the SSB and the preamble index, and/or the preamble resource.

In this embodiment, the mapping order between the preamble resource and the data resource is: an order of increasing the preamble resource index in a data resource; and/or, the data resource is incremented in the frequency domain; and/or, data resource is incremented in the time domain. The X may be greater than, or equal to, or a positive integer less than one.

For the mapping relationship described in this embodiment, multiple preamble indexes/resources may be corresponding to the same data resource, which may cause different UEs to have resource conflicts or interference problems on the same data resource. Possible solutions can be found in the sections that follow.

In some embodiments, the association relationship between the preamble resource and the data resource may further obtain an association relationship between the preamble index in the preamble resource and the data resource.

Embodiment 5

This embodiment provides a mapping/correspondence relationship between a preamble index and a data resource.

In some embodiments, the parameter Y indicates that the Y preamble indexes are associated with one data resource. The associated data resource may have a fixed resource size, and/or a variable resource size, and/or a set of different resource size sizes. If Y=1, it means that a preamble index is associated with a data resource. If Y>1, it means that Y preamble indexes are associated with one data resource. If Y<1, it means that a preamble index is associated with 1/Y data resources.

The mapping/corresponding sequence between the preamble index and the data resource includes at least one of the following: the preamble index is in increment or decrement order in the data resource; the data resource is incremented in the frequency domain, or the descending order; data resources are in ascending order in the time domain. In some embodiments, the SSB is associated with a preamble resource, and/or a preamble index.

Figure 22:
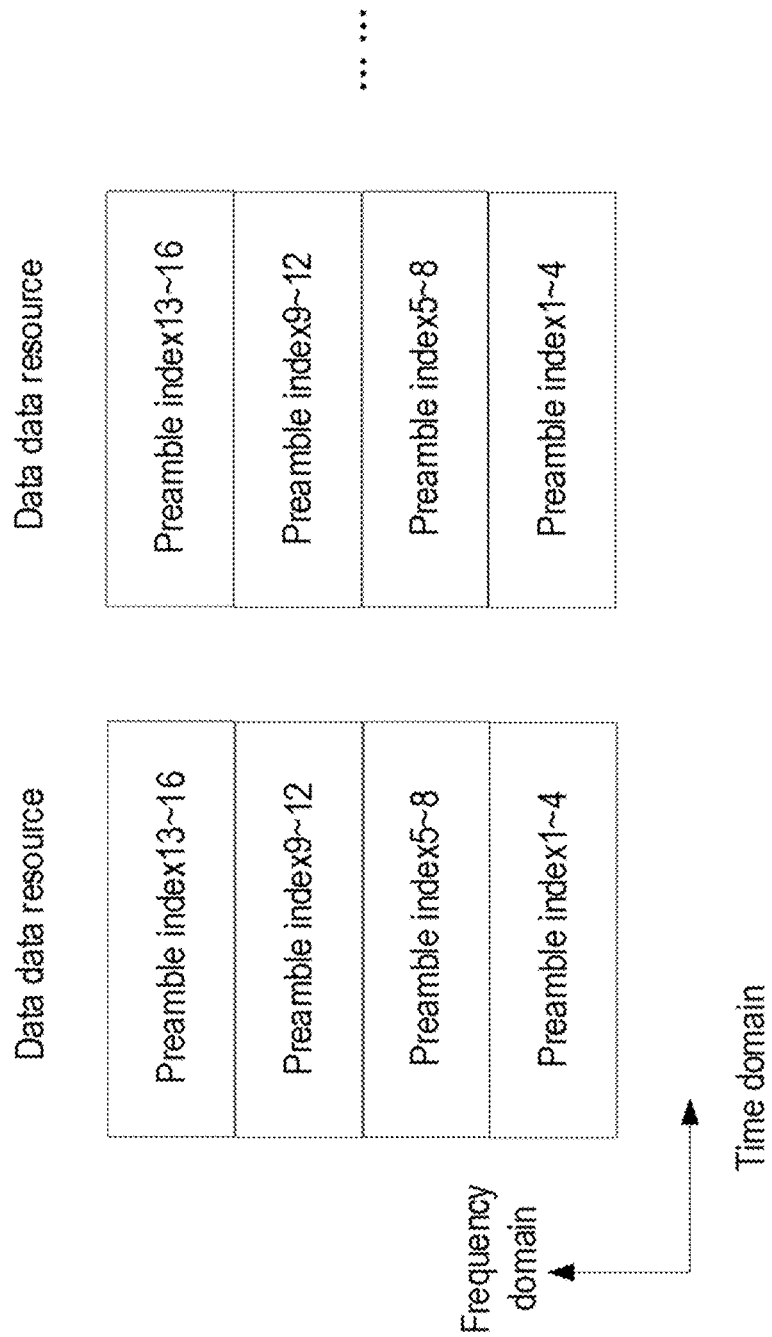
FIG. 22 shows an example of mapping between preamble indexes and data portions.

For example, suppose the number of preamble indexes is 16, Y=4 (indicating that 4 preamble indexes are associated with one data resource), and the number of data resources in the frequency domain is 4, according to the above mapping rule, as shown in FIG. 22.

Figure 23A:
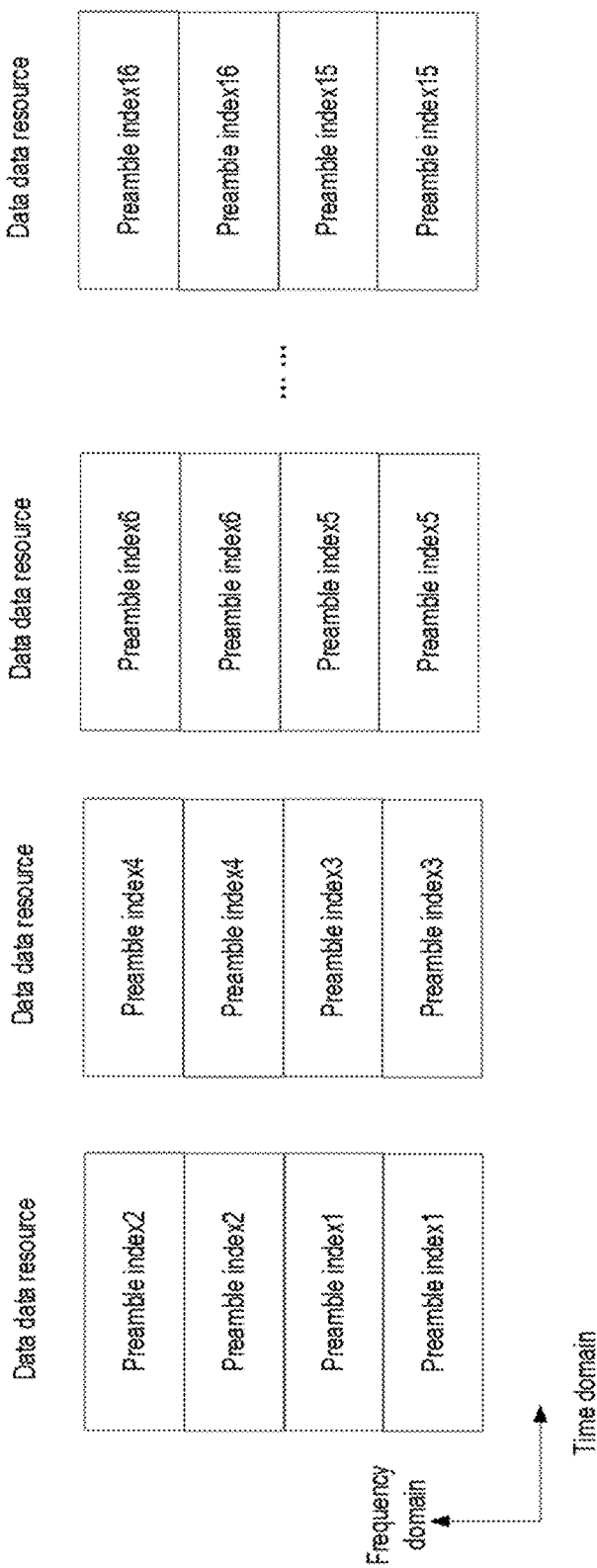
FIG. 23A shows an example of mapping between preamble indexes and data portions.

For example, assuming that the number of preamble indexes is 16, Y=½ (i.e., one preamble index corresponds to two data resources), the number of data resources in the frequency domain is 4, according to the above mapping rule, as shown in FIG. 23.

Alternatively, In some embodiments, the mapping/correspondence between the preamble index and the data resource includes at least one of the following: in a data resource, the preamble index in the randomly selected preamble index set is in accordance with increasing or decreasing order mapping; data resources is in increasing or decreasing order in the frequency domain; data is in the increasing order in time domain. In some embodiments, the preamble index mapped in the data resource should remove the already mapped preamble index. In some embodiments, the above mapping manner, and the association relationship, are also applicable to the preamble index group, and/or the Data resource group. In some embodiments, different random access type corresponding to different preamble index set. In some embodiments, different preamble index/set corresponding to different data resource/set.

Embodiment 6

This embodiment provides a solution to the resource conflict caused by different UEs transmitting on the same data resource.

Manner 1: Different time-frequency resources are used for different UE or preamble resource/set or preamble index/set on the same data resource. That is to say, different UE or preamble resource/set or preamble index/set on the same data resource is related to different time and/or frequency resources in one data resource. Specifically, the data resource is divided into T1 regions in the time domain, or the data resources are divided into T2 regions in the time domain and the frequency domain, or the data resources are divided into T3 regions in the frequency domain. Among them, the size of each interval/area is the same, or different.

Figure 23B:
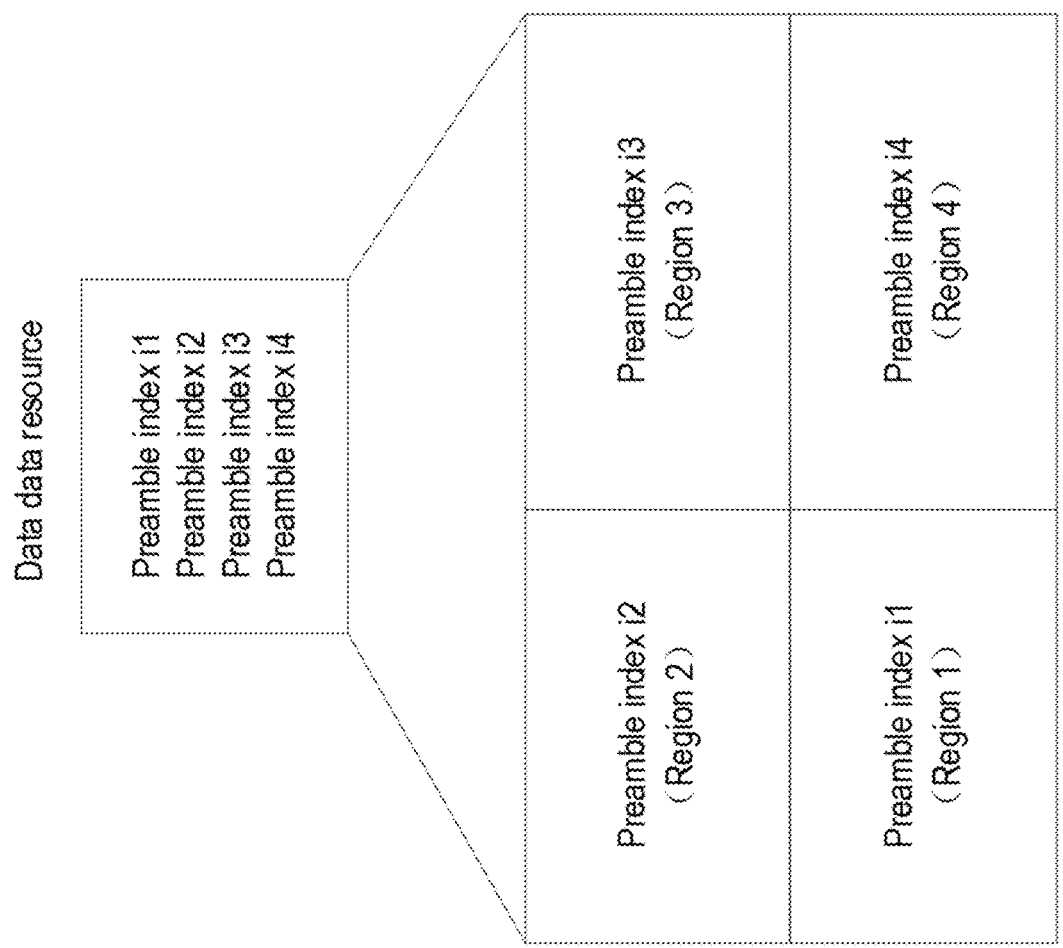
FIG. 23B shows an example of mapping between preamble indexes and data portions.
Figure 24:
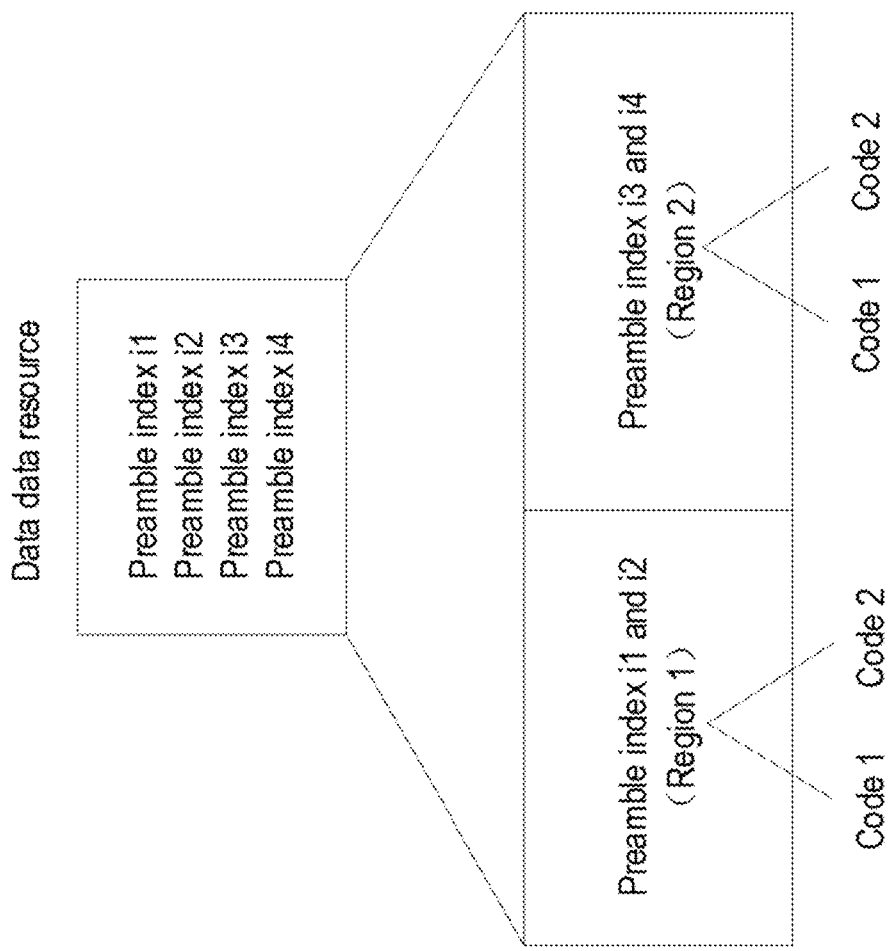
FIG. 24 shows an example of mapping between preamble indexes and data portions.

In some embodiments, the preamble index or preamble resource mapped in the same data resource is associated with the interval/region/code/beam index in the data resource. The division of the interval/area may be time division, and/or, frequency division, and/or code division. The preamble index, or preamble resource index is mapped in an increasing or decreasing order in an area; and/or, in a descending order or increasing order in a frequency domain region, and/or in an increasing order in time domain regions. In some embodiments, the preamble index or the preamble resource in the same area may be associated with a different orthogonal code. Alternatively, the area can also be extended to the whole Data resources. As shown in FIG. 23B, four preamble indexes are mapped into one data resource, and the four preamble indexes are associated with four regions in the data, which reduces the interference between different UEs to some extent. As shown in FIG. 24, the preamble index/set/resource/set is associated with the region index, and/or the region index is associated with the codeword index/set, or the preamble index/set/resource/set is associated with the codeword index/set. preamble indexes/resource in the same area use different code words. Alternatively, the codeword may be an orthogonal code, or a non-orthogonal code. In some embodiments, the preamble index in the same area uses the same codeword, and different cyclic shifts can also be introduced. The codeword can also be a sequence, or a modulation and demodulation method. The cyclic shift or codeword may also be an interleaving manner, or an encoding/checking matrix.

FIG. 24 shows another example of preamble index in the same data resource associated with different data section or codeword on the one data resource/section.

In some embodiments, different UEs or traffic type priority or preamble index/resource in the same data resource may be associated with one of the divided areas/codeword/beam according to a predetermined rule or in a random selection manner, and the different UE IDs may be replaced with service type priorities of different UEs.

Manner 2: Different orthogonal data is used for different UE data on the same data resource. For example, the preamble index/preamble resource in the same data resource is associated with the codeword. The codeword may also be an orthogonal code, or a non-orthogonal code. The relevant method in Mode 1 also applies to Mode 2.

Mode 3: Different UE data on the same data resource adopt different interleaver matrices. For example, the preamble index/preamble resource in the same data resource is associated with the different interleaver matrices.

Mode 4: Different UE data on the same data resource adopt different beam directions. For example, the preamble index/preamble resource in the same data resource is associated with the different beam direction/set. In some embodiments, data resource corresponding to one beam direction/one beam direction set.

Mode 5: Different UE data on the same data resource corresponding to different cyclic shift, or different generation sequences. The sequence may be an M sequence, or a ZC sequence. For example, the preamble index/preamble resource in the same data resource is associated with the different cyclic shift, or different generation sequences.

Mode 6: Different UE data on the same data resource correspond to different modulation modes. The modulation method includes at least one of the following: BPSK, QPSK, 16QAM, 64QAM. For example, the preamble index/preamble resource in the same data resource is associated with the modulation modes. In some embodiments, the above associate relationship can be obtained by at least one of the following: high layer RRC signaling, physical layer DCI signaling, MAC layer signaling, a predefined manner, and a bitmap. The high layer RRC signaling may be the remaining system information RMSI, and/or other system information SI.

Embodiment 7

This embodiment provides some configuration information required for performing MsgA messages.

If the UE supports the two-step contention-based random access procedure, the Msg A (at least one of preamble and the data portion) needs to obtain at least one of the following information:

PRACH resources;
Data resources. In some embodiments, the data resource may be a fixed size, or a dynamic size, or a data resource set, where the set includes multiple different resource size;
MsgA structure. The field is a transmission format indicating at least one of the preamble and the data in the MsgA. Fields are available if the preamble and/or data is transmitted as a whole structure. If the preamble and data are designed independently, this field is not enabled;
Data structure; for example, including at least one of the following: CP, Gap, reference signal, data, control channel.
The starting position of the frequency domain of the PRACH;
the starting position of the frequency domain of the data, or the offset between the data and the frequency domain position (starting position, or ending position) of the PRACH;
the start time position of the PRACH, or the offset between the data and the time domain position (start position, or end position) of the PRACH;
indication of the relationship between the PRACH resource and the data resource;
indication of the relationship between the preamble index and the data resource;
frequency hopping indication;
Timing adjustment, or timing adjustment set;
preamble and data transmission power indication: the indication is 0 indicating that the two powers are the same; the indication is 1 indicating that the power is different, and/or indicating a data transmission power, or a transmission power set;
Data transmission power;
The transmit power offset of the preamble and data portions; for example, when the transmit power offset of the preamble and data portions is 0, the transmit power is the same. If the transmission power offset of the preamble and data portions is P, it indicates that the data portion or the preamble transmission power is lower or higher than the preamble or data portion transmission power.

Data retransmission indication, or the number of Data transmissions;

association between at least one of the PRACH resource, the preamble index, and the data resource and the coding and/or modulation mode; for example, the association between the PRACH resource and the data resource, and the transmission of the preamble in the PRACH resource associated with the same data resource Each UE of the index is transmitted on the same data resource, and may be processed by using an orthogonal code associated with the PRACH resource or the transmitted preamble index, or a chip, or a sequence, or a modulation scheme. In some embodiments, if the same coding mode is used on the same data resource, it may be processed by at least one of different encoders, interleavers, and scrambling sequences.

association between at least one of the PRACH resource and the preamble index and different resource regions in the same data resource; for example, at least one of the PRACH resource and the preamble index corresponding to the same data resource in the data resource The mapping on the area can be mapped in ascending order in the frequency domain, and then in the order of increasing the time domain. In some embodiments, the association between at least one of the establishment of the PRACH resource and the preamble index and a resource area may be one-to-many, or many-to-one, or many-to-many.

At least one of the PRACH resource and the preamble index is associated with a codeword in the same data resource.

preamble portion and data portion multiplexing method;

Data MCS, or, MCS set. For example, if the MCS set is configured, the UE may select one MCS as the data from the MCS set. The selection is based on the measurement information of the received downlink signal, predefined, randomly selected, and selected to be similar to the UE side expectation. Alternatively, the UE may also determine the MCS by itself. The MCS information notified by the base station is not considered.

Whether the SCS of the preamble and data are the same enable indicator; for example, 0 means the same and 1 means different. In some embodiments, when the indication is 1, the at least one of the data and the SCS adopted by the preamble may be corresponding.

SCS of Data;

Interleaved unit indication of data;

Interleaved unit indication of MsgA;

an interleaved unit indication of the PRACH resource;

The frequency domain pattern of Data;

The frequency domain interval of Data;

The number of resources that Data occupies in the frequency domain;

Data resource allocation mode; the mode includes: continuous, or, non-continuous (interleaved structure)

preamble resource allocation mode; the mode includes: continuous, or, discontinuous (interleaved structure);

Scheduling information; for example, TB block size.

The mode of the random access procedure; for example, the contention-based random access mode includes at least one of the following: a two-step random access procedure, and a four-step random access procedure.

At least one of the foregoing information may be determined by at least one of the following: high layer RRC signaling, physical layer DCI signaling, MAC layer signaling, a predefined manner, and a bitmap. The high layer RRC signaling may be the remaining system information RMSI, and/or other system information SI.

In some embodiments, the PRACH configuration information can be independent of the data configuration information, or they may be configured as a unified configuration. In some embodiments, data configuration information, such as resource location, period, start symbol, SCS, resource structure/format, etc., may be introduced in the established PRACH resource configuration information table.

In some embodiments, a data resource configuration information table may be established, for example, resource location (In some embodiments, subframe location, and/or, slot location, and/or symbol location), period, start symbol, SCS, resource structure/format.

Figure 25:
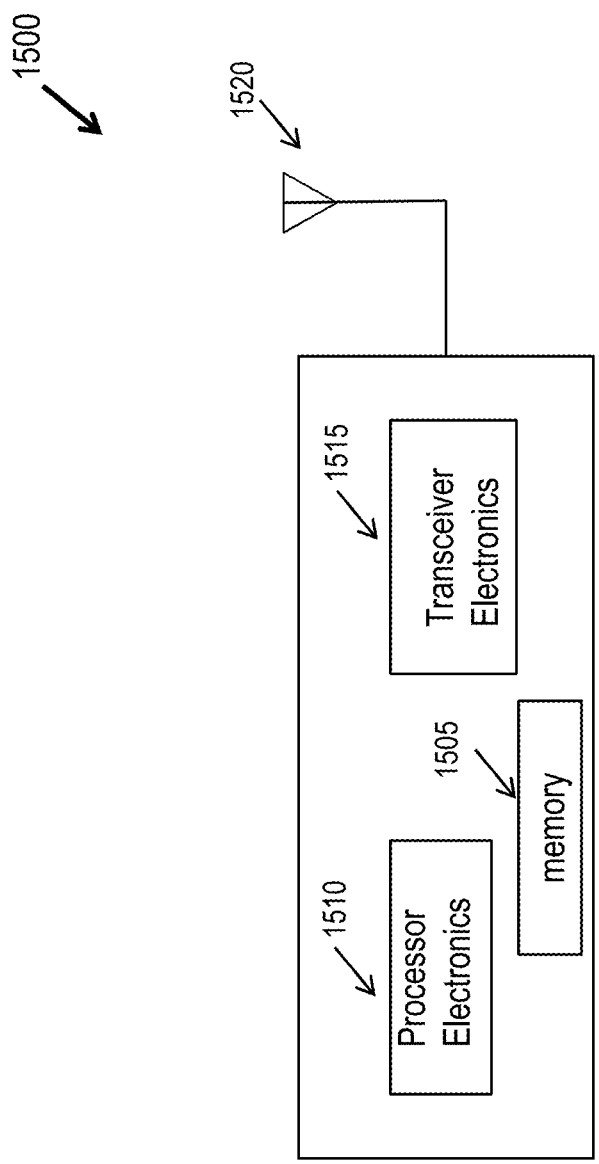
FIG. 25 is a block diagram showing an example embodiment of a wireless communication device.

FIG. 25 depicts a block diagram representing of a portion of a radio station 2505. A radio station 2505 such as a base station or a wireless device can include processor electronics 2510 such as a microprocessor that implements one or more of the wireless techniques presented in this document. The radio station 2505 can include transceiver electronics 2515 to send and/or receive wireless signals over one or more communication interfaces such as antenna 2520. The radio station 2505 can include other communication interfaces for transmitting and receiving data. Radio station 2505 can include one or more memories (not explicitly shown) configured to store information such as data and/or instructions. In some implementations, the processor electronics 2510 can include at least a portion of the transceiver electronics 2515. In some embodiments, at least some of the disclosed techniques, modules or functions are implemented using the radio station 2505.

Figure 26:
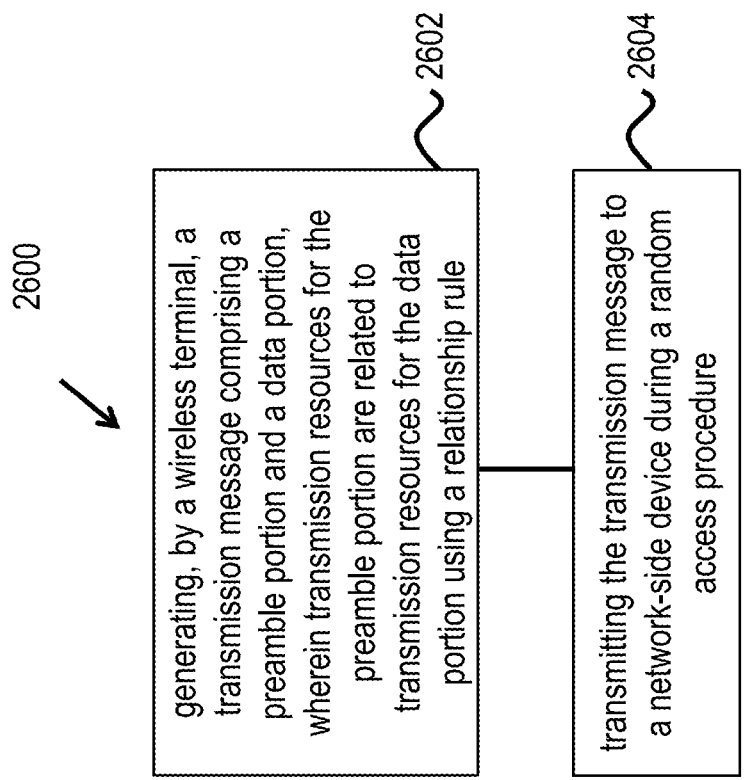
FIG. 26 shows a flowchart for example methods of wireless communication.

FIG. 26 is a flowchart for a method 2600 of wireless communication. The method 2600 includes generating (2602), by a wireless terminal, a transmission message including a preamble portion and a data portion, where transmission resources for the preamble portion are related to transmission resources for the data portion using a relationship rule, and transmitting (2604) the transmission message to a network-side device during a random access procedure.

Figure 27:
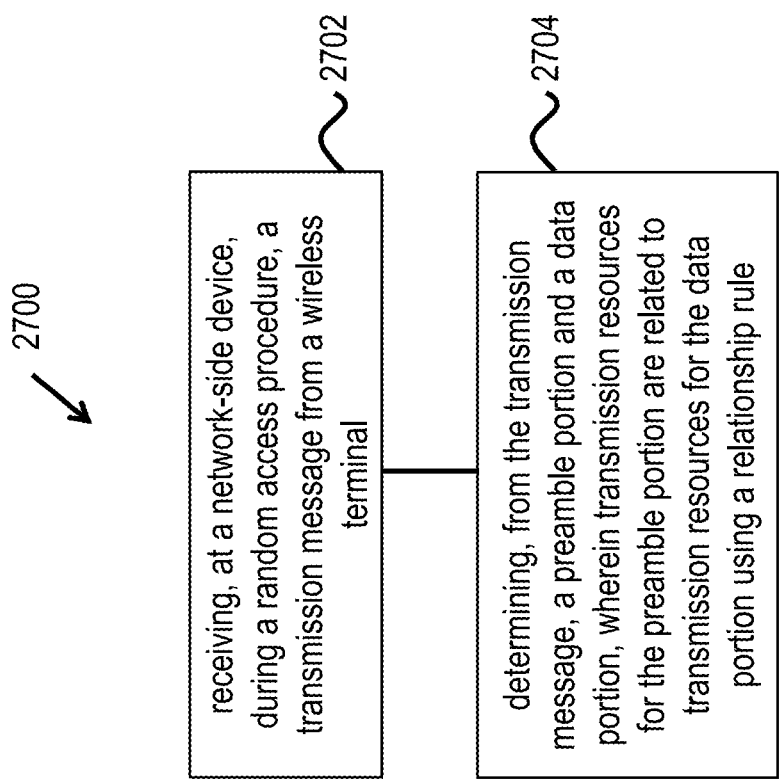
FIG. 27 shows a flowchart for an example method of wireless communication.

FIG. 27 is a flowchart for a method 2700 of wireless communication. The method 2700 includes receiving (2702), at a network-side device, during a random access procedure, a transmission message from a wireless terminal, and determining (2704), from the transmission message, a preamble portion and a data portion, where transmission resources for the preamble portion are related to transmission resources for the data portion using a relationship rule.

Figure 28:
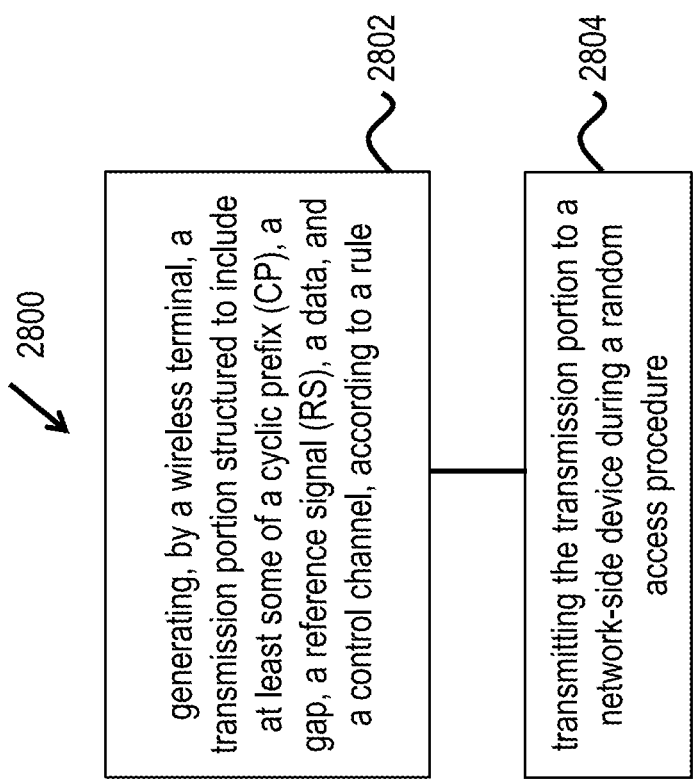
FIG. 28 shows a flowchart for an example method of wireless communication.

FIG. 28 is a flowchart for a method 2800 of wireless communication. The method 2800 includes generating (2802), by a wireless terminal, a transmission portion structured to include at least some of a cyclic prefix (CP), a gap, a reference signal (RS), a data, and a control channel, according to a rule, and transmitting (2804) the transmission portion to a network-side device during a random access procedure.

Figure 29:
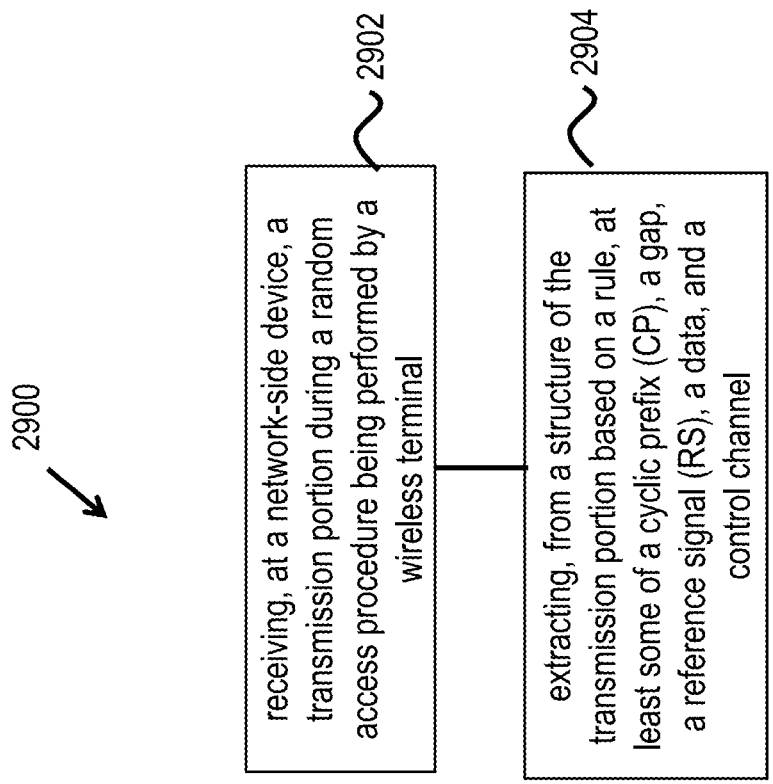
FIG. 29 shows a flowchart for an example method of wireless communication.

FIG. 29 is a flowchart for a method 2900 of wireless communication. The method 2900 includes receiving (2902), at a network-side device, a transmission portion during a random access procedure being performed by a wireless terminal, and extracting (2904), from a structure of the transmission portion based on a rule, at least some of a cyclic prefix (CP), a gap, a reference signal (RS), a data, and a control channel.

With respect to the methods 2600 and 2700, the present document provides several examples of the relationship rule and corresponding structures of transmission signals in which data portions and/or preamble portions are present in FIGS. 1A to 24.

For example, in some embodiments, the relationship rule specifies that transmission resources for the data portion are determined by a time offset in a time domain and/or a frequency offset in a frequency domain from transmission resources for the preamble portion. In some embodiments, the time offset is a function of a starting position or an ending position for the preamble portion in the time domain. In some embodiments, the frequency offset is a function of a starting position or an ending position of the preamble position in the frequency domain. FIG. 14 depicts an example of such an arrangement of preamble portion and data portion in a two-dimensional time-frequency resource grid. FIG. 7B to FIG. 13 provide additional examples.

In some example implementations of methods 2600 and 2700, the data portion and the preamble portion use interleaving structures, and where an interleaving unit of the data portion is different from an interleaving unit of the preamble portion. FIGS. 11 and 12 show some example embodiments of the interleaving unit in which interleaving portions are interleaved.

In some embodiments, the preamble portion and the data portion are multiplexed by time division multiplexing, and where a same interleaving unit is configured for the preamble portion and the data portion. Some example embodiments are described with reference to FIGS. 11 and 12.

In some embodiments, one of the data portion and preamble portion is transmitted using non-interleaved resources, and the other is transmitted using an interleaving structure. Some example embodiments are described with reference to FIGS. 11 and 12.

In some embodiments, the resource position of one of the data portion and the preamble portion in non-interleaved resources is determined by at least one of the following: an offset/starting position, an end position, a continuous length, an interval, and a number of occupied resources. Some example embodiments are described with reference to FIGS. 11 and 12.

In some implementations of methods 2600 and 2700, the relationship rule specifies that a Cyclic Prefix length of the data portion is same as a Cyclic Prefix length of the preamble portion. FIG. 9 and the corresponding description shows one such example. FIG. 10 shows another example implementation.

In some implementations of methods 2600 and 2700, the relationship rule specifies that the data portion is a part of the preamble portion. For example, structure 5 in Embodiment 3 provides one example implementation.

In some implementations of methods 2600 and 2700, the relationship rule specifies that one or more preamble resources or one or more preamble indexes are related to one or more data resources, where, X denotes X preamble resources associated with one data resource; or Y denotes Y preamble indexes associated with one data resource; where X and Y are integers or fractions. In some embodiments, the mapping rules includes at least one of the following: in increasing or decreasing order of Preamble resource indexes within one data resource; in increasing or decreasing order of frequency resource indexes for frequency data resource; in increasing order for data resource in the time domain. Various embodiments are described with respect to FIGS. 15 to 24.

In some embodiments of methods 2600 and 2700, the relationship rule specifies that resources for the data portion are determined by at least one of the following: preamble index i and data resource i; or preamble resource i and data resource i; or preamble resource i and data resource S-i or S-1-i; or preamble index i and data resource S-i or S-1-i; or preamble resource/index i=data resource j mod preamble resource number; or preamble resource/index i=(data resource index j+random number) mod preamble resource number. Here, S and i are integers. Various embodiments are described with respect to FIGS. 15 to 24.

In some embodiments, the mapping rules or the relationship rules include at least one of: t preamble resources or t1 preamble index as one group in turn mappings to resources for the data portion according to an increasing or a decreasing order in time domain or according to increasing or decreasing order in the frequency domain; where the mapping maps, within one physical shared channel transmission resource, preamble resource indexes in a decreasing order to the data portion. Various embodiments are described with respect to FIGS. 15 to 24.

In some embodiments, multiple preamble resources or indexes are mapped to one data resource (e.g., transmission resource used for the data portion) and these include one or more of: a preamble resource or index related to a codeword within one data resource; a preamble resource or index related to different areas within one data resource; a preamble resource or index related to different beam within one data resource; a preamble resource or index related to different modulation modes within one data resource; a preamble resource or index related to different cyclic shift of one sequence within one data resource; and a preamble resource or index related to different sequence within one data resource.

In some implementations of methods 2600 and 2700, the random access procedure may be a two-step process such as being proposed for low latency applications.

In some implementations of methods 2800 and 2900, the rule specifies placement of the gap or the CP before at least one of the RS, the data and the control channel. Various examples of implementations of methods 2800 and 2900 are described with reference to FIGS. 1A to 7A.

In some implementations of methods 2800 and 2900, the rule specifies to place a guard time or another gap after at least one of the RS, the data and the control channel. Some examples are described with reference to FIGS. 1A to 7A.

As described herein, a wireless terminal may be a hardware device such as a smartphone, an Internet of Things device, a table, or any other implementation of wireless communication capable device, such as depicted in FIG. 25. The network-side device may represent gNB or another network-side function that is implemented using a hardware platform such as described in FIG. 25.

It will be appreciated that the present document discloses several time domain transmission structures for data portion that provide certain operational advantages in low latency random access such as a two-step random access procedure. It will further be appreciated that several relationships between preamble portion and data portion of a message transmission during the two-step random access process are described.

It will also be appreciated that the present document provides techniques for mapping between preamble index and data resources that can be used during low latency random access. Furthermore, a resource conflict resolution technique is provided by which different user devices are able to transmit on the same data transmission resources simultaneously.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A wireless communication method, comprising:
    generating, by a wireless terminal, a transmission message comprising a preamble portion and a data portion, wherein transmission resources for the data portion are determined by a time-domain offset from transmission resources for the preamble portion, wherein one or more preamble indices of the preamble portion are related to a transmission resource for the data portion, wherein the one or more preamble indices related to the transmission resource for the data portion are in an increasing order, wherein the transmission resources for the data portion are in an increasing order in a frequency domain and in an increasing order in a time domain, wherein the transmission resources for the data portion adopt an interleaving structure comprising one or more resource blocks, and wherein a starting position of a first transmission resource for the data portion is determined based on an offset from a configured bandwidth of a bandwidth part; and
    transmitting the transmission message to a network-side device during a random access procedure.

2. The method of claim 1, wherein the one or more preamble indices of the preamble portion are related to the transmission resource for the data portion based on:
    an association between a preamble index and a beam within the transmission resource for the data portion; and an association between the preamble index and a sequence within the transmission resource for the data portion.

3. The method of claim 1, wherein the preamble portion is time-division multiplexed with the data portion, and wherein an offset exists between a starting position of the preamble portion and a starting position of the data portion.

4. The method of claim 1, wherein the preamble portion and the data portion use a same beam direction.

5. A wireless communication method, comprising:
receiving, by a network device, a transmission message from a wireless terminal in a random access procedure, wherein the transmission message comprises a preamble portion and a data portion, wherein transmission resources for the data portion are determined by a time-domain offset from transmission resources for the preamble portion, wherein one or more preamble indices of the preamble portion are related to a transmission resource for the data portion, wherein the one or more preamble indices related to the transmission resource for the data portion are in an increasing order, wherein the transmission resources for the data portion are in an increasing order in a frequency domain and in an increasing order in a time domain, wherein the transmission resources for the data portion adopt an interleaving structure comprising one or more resource blocks, and wherein a starting position of a first transmission resource for the data portion is determined based on an offset from a configured bandwidth of a bandwidth part; and
transmitting, by the network device, a response message to the wireless terminal in response to the transmission message.

6. The method of claim 5, wherein the one or more preamble indices of the preamble portion are related to the transmission resource for the data portion based on:
an association between a preamble index and a beam within the transmission resource for the data portion; and
an association between the preamble index and a sequence within the transmission resource for the data portion.

7. The method of claim 5, wherein the preamble portion is time-division multiplexed with the data portion, and wherein an offset exists between a starting position of the preamble portion and a starting position of the data portion.

8. The method of claim 5, wherein the preamble portion and the data portion use a same beam direction.

9. A device for wireless communication, comprising a processor configured to:
generate a transmission message comprising a preamble portion and a data portion, wherein transmission resources for the data portion are determined by a time-domain offset from transmission resources for the preamble portion, wherein one or more preamble indices of the preamble portion are related to a transmission resource for the data portion, wherein the one or more preamble indices related to the transmission resource for the data portion are in an increasing order, wherein the transmission resources for the data portion are in an increasing order in a frequency domain and in an increasing order in a time domain, wherein the transmission resources for the data portion adopt an interleaving structure comprising one or more resource blocks, and wherein a starting position of a first transmission resource for the data portion is determined based on an offset from a configured bandwidth of a bandwidth part; and
transmit the transmission message to a network-side device during a random access procedure.

10. The device of claim 9, wherein the one or more preamble indices of the preamble portion are related to the transmission resource for the data portion based on:
an association between a preamble index and a beam within the transmission resource for the data portion; and
an association between the preamble index and a sequence within the transmission resource for the data portion.

11. The device of claim 9, wherein the preamble portion is time-division multiplexed with the data portion, and wherein an offset exists between a starting position of the preamble portion and a starting position of the data portion.

12. The device of claim 9, wherein the preamble portion and the data portion use a same beam direction.

13. A device for wireless communication, comprising a processor configured to:
receive a transmission message from a wireless terminal in a random access procedure, wherein the transmission message comprises a preamble portion and a data portion, wherein transmission resources for the data portion are determined by a time-domain offset from transmission resources for the preamble portion, wherein one or more preamble indices of the preamble portion are related to a transmission resource for the data portion, wherein the one or more preamble indices related to the transmission resource for the data portion are in an increasing order, and wherein the transmission resources for the data portion are in an increasing order in a frequency domain and in an increasing order in a time domain, wherein the transmission resources for the data portion adopt an interleaving structure comprising one or more resource blocks, and wherein a starting position of a first transmission resource for the data portion is determined based on an offset from a configured bandwidth of a bandwidth part; and
transmit a response message to the wireless terminal in response to the transmission message.

14. The device of claim 13, wherein the one or more preamble indices of the preamble portion are related to the transmission resource for the data portion based on:
an association between a preamble index and a beam within the transmission resource for the data portion; and
an association between the preamble index and a sequence within the transmission resource for the data portion.

15. The device of claim 13, wherein the preamble portion is time-division multiplexed with the data portion, and wherein an offset exists between a starting position of the preamble portion and a starting position of the data portion.

16. The device of claim 13, wherein the preamble portion and the data portion use a same beam direction.

* * * * *